US011858278B2

(12) United States Patent
Tanaka et al.

(10) Patent No.: US 11,858,278 B2
(45) Date of Patent: Jan. 2, 2024

(54) LIQUID SUPPLYING APPARATUS, LIQUID EJECTING APPARATUS, AND METHOD FOR CONTROLLING LIQUID EJECTING APPARATUS

(71) Applicant: SEIKO EPSON CORPORATION, Tokyo (JP)

(72) Inventors: Eri Tanaka, Shiojiri (JP); Kazuyuki Fujioka, Matsumoto (JP); Masaki Uchiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 51 days.

(21) Appl. No.: 17/663,776

(22) Filed: May 17, 2022

(65) Prior Publication Data

US 2022/0371329 A1 Nov. 24, 2022

(30) Foreign Application Priority Data

May 19, 2021 (JP) ................................ 2021-084495

(51) Int. Cl.
*B41J 2/175* (2006.01)

(52) U.S. Cl.
CPC ................................ *B41J 2/17596* (2013.01)

(58) Field of Classification Search
CPC .... B41J 2/17596; B41J 2/175; B41J 2/17509; B41J 29/38
See application file for complete search history.

(56) References Cited

U.S. PATENT DOCUMENTS

| | | | | |
|---|---|---|---|---|
| 8,622,533 B2 * | 1/2014 | Takahashi | B41J 2/19 347/85 |
| 9,868,294 B2 * | 1/2018 | Hori | B41J 2/17596 |
| 11,173,721 B2 * | 11/2021 | Takahashi | B41J 2/17566 |
| 2009/0179974 A1 * | 7/2009 | Kimura | B41J 2/17509 347/85 |
| 2010/0214332 A1 | 8/2010 | Iwase | |

FOREIGN PATENT DOCUMENTS

JP 2010-194915 9/2010

* cited by examiner

*Primary Examiner* — An H Do
(74) *Attorney, Agent, or Firm* — WORKMAN NYDEGGER

(57) ABSTRACT

A liquid ejecting apparatus includes a liquid supplying apparatus. The liquid supplying apparatus includes a supply flow passage that is in communication with a liquid ejecting head configured to eject liquid, a first supply flow passage for communication between a first liquid container and the supply flow passage, the first liquid container containing liquid, and a second supply flow passage for communication between a second liquid container and the supply flow passage, the second liquid container containing the same kind of liquid as the liquid contained in the first liquid container, a switching unit configured to switch a flow passage that is in communication with the supply flow passage, between the first supply flow passage and the second supply flow passage, and a movement restriction unit configured to, linked with switching by the switching unit, restrict movement of the first liquid container and the second liquid container selectively.

11 Claims, 12 Drawing Sheets

| | | STATE 1 | STATE 2 | STATE 3 |
|---|---|---|---|---|
| FIRST SLOT SL1 | FIRST ON-OFF VALVE 54 | OPEN | CLOSED | CLOSED |
| | FIRST LOCK MECHANISM 391 | LOCK | UNLOCK | UNLOCK |
| SECOND SLOT SL2 | SECOND ON-OFF VALVE 55 | CLOSED | CLOSED | OPEN |
| | SECOND LOCK MECHANISM 392 | UNLOCK | UNLOCK | LOCK |

LIQUID SUPPLYING APPARATUS, LIQUID EJECTING APPARATUS, AND METHOD FOR CONTROLLING LIQUID EJECTING APPARATUS

The present application is based on, and claims priority from JP Application Serial Number 2021-084495, filed May 19, 2021, the disclosure of which is hereby incorporated by reference herein in its entirety.

BACKGROUND

1. Technical Field

Embodiments of the present disclosure relate to a liquid supplying apparatus, a liquid ejecting apparatus, and a method for controlling the liquid ejecting apparatus.

2. Related Art

JP-A-2010-194915 discloses an ink-jet-type image forming apparatus as an example of a liquid ejecting apparatus configured to use a plurality of liquid containers (for example, ink tanks), with switching therebetween, each of which is configured to supply liquid to a liquid ejecting head capable of ejecting the liquid. The image forming apparatus disclosed in JP-A-2010-194915 includes two liquid containers for each color, a common tube through which ink flowing out of the liquid containers can flow to the recording head, and a switching valve configured to perform switching for selecting one of the two containers as the source from which the ink is supplied. A sensor detects that one, of the two liquid containers, that is currently used has run out of ink. Upon the detection, the switching valve is controlled based on the detection result to switch, from the one to the other, the liquid container from which ink is supplied to the recording head. The switching makes it possible to continue the image forming operation without interruption.

When switching from the one that has run out of ink to the other of the liquid containers occurs, the image forming apparatus disclosed in JP-A-2010-194915 displays the liquid container that is currently used on its operation panel. Displaying this information enables the user of the image forming apparatus to know the liquid container that is currently used. Then, the user is able to replace the liquid container that has run out of ink with new one as needed. As described here, the image forming apparatus disclosed in JP-A-2010-194915 has a so-called hot-swap function, which makes it possible to detach the liquid container that has run out of ink and replaces it with new one while printing is performed.

However, in a liquid ejecting apparatus having such a hot-swap function, there is a possibility that the liquid container that is currently used might be confused with the liquid container that needs to be replaced and thus might be removed by mistake while printing is performed. If this happens, the wrong detachment of the liquid container that is currently used might cause a trouble in the liquid ejecting apparatus. This problem is not limited to such a case of wrong detachment during printing. A similar problem might occur also when the liquid container that is currently used is removed while liquid-consuming operation, in which a liquid ejecting head consumes liquid, is performed. An example of the liquid-consuming operation other than printing is maintenance operation, in which liquid is discharged from the nozzles of the liquid ejecting head for the purpose of maintenance.

SUMMARY

A liquid supplying apparatus according to a certain aspect of the present disclosure includes: a supply flow passage that is in communication with a liquid ejecting head configured to eject liquid; a first supply flow passage for communication between a first liquid container and the supply flow passage, the first liquid container containing liquid; a second supply flow passage for communication between a second liquid container and the supply flow passage, the second liquid container containing a same kind of liquid as the liquid contained in the first liquid container; a switching unit configured to switch a flow passage that is in communication with the supply flow passage, between the first supply flow passage and the second supply flow passage; and a movement restriction unit configured to, linked with switching by the switching unit, restrict movement of the first liquid container and the second liquid container selectively.

A liquid ejecting apparatus according to a certain aspect of the present disclosure includes: a liquid ejecting head configured to eject liquid; the liquid supplying apparatus described above; and a control unit that controls the switching unit and the movement restriction unit.

Another aspect of the present disclosure is a method for controlling a liquid ejecting apparatus, the liquid ejecting apparatus including a liquid ejecting head that performs recording by ejecting liquid onto a medium, a supply flow passage that is in communication with the liquid ejecting head, a first supply flow passage for communication between a first liquid container and the supply flow passage, the first liquid container containing liquid, a second supply flow passage for communication between a second liquid container and the supply flow passage, the second liquid container containing a same kind of liquid as the liquid contained in the first liquid container, a switching unit configured to switch a flow passage that is in communication with the supply flow passage, between the first supply flow passage and the second supply flow passage, and a movement restriction unit configured to, linked with switching by the switching unit, restrict movement of the first liquid container and the second liquid container selectively, the method comprising: when instructions for operation involving liquid consumption are received, bringing either the first supply flow passage or the second supply flow passage into communication with the supply flow passage by the switching unit, and restricting the movement of the liquid container that is currently in communication with the supply flow passage by the movement restriction unit; performing the operation involving liquid consumption; and after the operation is performed, performing switching to a state in which neither of the first supply flow passage and the second supply flow passage is in communication with the supply flow passage by the switching unit, and performing restriction cancellation such that neither of the movement of the first liquid container and the movement of the second liquid container is restricted by the movement restriction unit.

Still another aspect of the present disclosure is a method for controlling a liquid ejecting apparatus, the liquid ejecting apparatus including a liquid ejecting head that performs recording by ejecting liquid onto a medium, a supply flow passage that is in communication with the liquid ejecting head, a first supply flow passage for communication between a first liquid container and the supply flow passage, the first liquid container containing liquid, a second supply flow passage for communication between a second liquid container and the supply flow passage, the second liquid container containing a same kind of liquid as the liquid contained in the first liquid container, a switching unit configured to switch a flow passage that is in communication with the supply flow passage, between the first supply flow passage and the second supply flow passage, and a movement restriction unit configured to, linked with switching by the switching unit, restrict movement of the first liquid container and the second liquid container selectively, the method comprising: when the liquid ejecting apparatus is powered on, bringing either the first supply flow passage or the second supply flow passage into communication with the supply flow passage by the switching unit, and restricting the movement of the liquid container that is currently in communication with the supply flow passage by the movement restriction unit; and when instructions for turning the power off are received, performing switching to a state in which neither of the first supply flow passage and the second supply flow passage is in communication with the supply flow passage by the switching unit, and performing restriction cancellation such that neither of the movement of the first liquid container and the movement of the second liquid container is restricted by the movement restriction unit.

DESCRIPTION OF EXEMPLARY EMBODIMENTS

Figure 1:
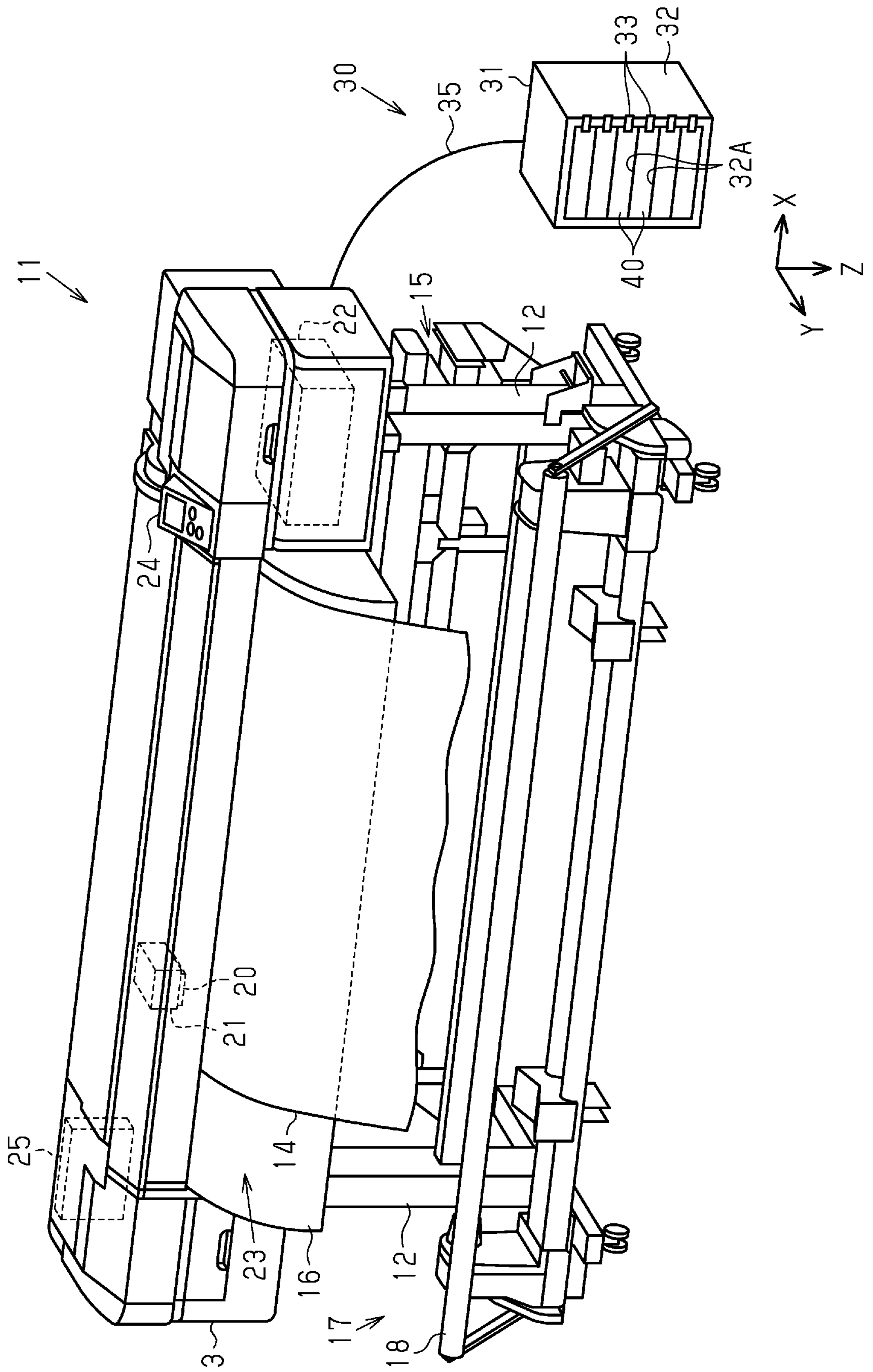
FIG. 1 is a perspective view of a liquid ejecting apparatus according to a first embodiment.

With reference to the accompanying drawings, a liquid supplying apparatus and a liquid ejecting apparatus according to an exemplary embodiment will now be explained. The liquid ejecting apparatus disclosed in the embodiment below is, for example, an ink-jet printer that performs printing by ejecting liquid such as ink onto a medium such as paper.

In the drawings, it is assumed that a liquid ejecting apparatus 11 is installed on a horizontal plane, and, based on this assumption, the direction of gravity is indicated by a Z axis, and the directions along the horizontal plane are indicated by an X axis and a Y axis. The X, Y, and Z axes are orthogonal to one another. In the description below, the direction along the X axis may be referred to as a width direction X, the direction along the Y axis may be referred to as a depth direction Y, and the direction along the Z axis may be referred to as a vertical direction Z.

Configuration of Liquid Ejecting Apparatus

As illustrated in FIG. 1, the liquid ejecting apparatus 11 includes a liquid ejecting head 20 capable of ejecting liquid, a liquid supplying apparatus 30 for supplying the liquid to the liquid ejecting head 20, and a control unit 25. The liquid supplying apparatus 30 includes a supply flow passage 35 that is in communication with the liquid ejecting head 20.

The liquid supplying apparatus 30 includes a mounting unit 31 into which a plurality of liquid containers 40 can be detachably mounted by insertion. The mounting unit 31 includes a housing case 32 capable of housing the plurality of liquid containers 40 inside. The housing case 32 has slots 32A. The slots 32A are respective housing spaces into which the plurality of liquid containers 40 can be inserted individually. The mounting unit 31 includes engagement portions 33 configured to be engaged with the liquid containers 40 inserted in the slots 32A. The engagement portion 33 is provided on the housing case 32 individually for each of the plurality of slots 32A. The engagement portion 33 has a locking function for preventing the liquid container 40 from being detached by the user during printing.

The liquid container 40 contains liquid that is to be supplied to the liquid ejecting head 20. That is, the liquid container 40 is a liquid supplying source from which the liquid is supplied to the liquid ejecting head 20. The liquid ejecting head 20 according to this example ejects ink or the like as an example of the liquid. Therefore, the liquid container 40 contains ink as an example of the liquid. The liquid container 40 is, for example, a liquid cartridge such as an ink cartridge. The liquid container 40 may be any other type of liquid container as long as it can be detachably mounted into the mounting unit 31. For example, the liquid container 40 may be a liquid tank such as an ink tank which can be refilled with liquid by the user.

The liquid ejecting head 20 according to the present embodiment ejects more than one kind of liquid. Groups each consisting of a plurality of liquid containers 40 containing the same kind of liquid, among the plural kinds of liquid which the liquid ejecting head 20 is capable of ejecting, can be detachably mounted by insertion into the mounting unit 31. For example, N pairs or sets, each containing the same kind of liquid (three pairs in the example illustrated in FIG. 1), of the liquid containers 40 can be detachably mounted by insertion into the mounting unit 31. The number of the N pairs or sets, each containing the same kind of liquid, of the liquid containers 40 may be one, or two or more. If the liquid is ink, though not limited thereto, the kinds of the liquid are, for example, the kinds of the ink. The kinds of the ink are, for example, ink-color types.

As illustrated in FIG. 1, the liquid ejecting apparatus 11 includes a cabinet 13 housing the liquid ejecting head 20 inside. The cabinet 13 may be supported by a pair of legs 12. The liquid supplying apparatus 30 may be provided separately from the cabinet 13 as illustrated in FIG. 1. Alternatively, the liquid supplying apparatus 30 may be provided integrally with the cabinet 13.

In the liquid ejecting apparatus 11 according to the present embodiment, the liquid ejecting head 20 ejects liquid toward a medium 14. If the liquid is ink, though not limited thereto, the liquid ejecting apparatus 11 performs printing on the medium 14 by ejecting ink from the liquid ejecting head 20. Therefore, the liquid ejecting apparatus 11 may be equipped with a transportation unit 23 configured to transport the medium 14. The medium 14 may have a long shape, or may be a cut sheet having a predetermined length. If the medium 14 is paper, though not limited thereto, the medium 14 may be roll paper or cut-sheet paper.

As illustrated in FIG. 1, the transportation unit 23 may use a roll transportation scheme of transporting the medium 14 having a long shape from a medium roll (not illustrated). The transportation unit 23 may include an unreeling portion 15 configured to unreel and feed the medium 14 from the medium roll, a guiding portion 16 for guiding the medium 14 ejected out of the cabinet 13 after printing, and a taking-up portion 17 configured to reel and take up the medium 14. The transportation unit 23 may include a tensioning mechanism 18 configured to apply tension to the medium 14 that is to be taken up onto the taking-up portion 17. The transportation unit 23 includes transportation rollers (not illustrated) configured to transport the medium 14 toward a recording position where the medium 14 is to face the liquid ejecting head 20. The liquid ejecting head 20 performs printing on the medium 14 by ejecting liquid such as ink toward the medium 14 transported by the transportation unit 23.

The recording scheme of the liquid ejecting head 20 may be serial recording illustrated in FIG. 1 or line recording. The liquid ejecting apparatus 11 using the serial recording scheme includes a carriage 21 configured to move the liquid ejecting head 20. The liquid ejecting apparatus 11 alternates recording operation, in which liquid is ejected from the liquid ejecting head 20 while the carriage 21 moves in the width direction X intersecting with the transportation direction of the medium 14, and transportation operation, in which the transportation unit 23 transports the medium 14 to the next recording position. By this alternate execution of the recording operation and the transportation operation, the liquid ejecting apparatus 11 performs printing on the medium 14.

If the line recording scheme is used, the liquid ejecting head 20 is configured as a line head or a multiple-type head having a plurality of nozzles for making it possible to perform recording throughout the entire width of the medium 14 at a time. The liquid ejecting apparatus 11 performs printing on the medium 14 by ejecting liquid from the nozzles of the liquid ejecting head 20 onto the medium 14 transported at a predetermined transportation speed. The term “line head” as used herein means a single elongated head. The term “multiple-type head” as used herein means a head array made up of a plurality of unit heads arranged throughout the entire width of the medium 14.

The liquid ejecting apparatus 11 may be equipped with a maintenance unit 22 configured to perform maintenance on the liquid ejecting head 20. The maintenance unit 22 performs maintenance operation of discharging liquid from the nozzles of the liquid ejecting head 20 forcibly. When an image is formed by print operation of the liquid ejecting head 20, some of the nozzles are used for ejecting liquid therefrom, and the others are not used for ejecting liquid therefrom. The viscosity of the liquid inside the nozzles that are not used increases gradually. Moreover, in some instances air goes into the liquid inside a nozzle. Air dissolved into liquid by permeation through the supply flow passage 35 made of a tube grows gradually into an air bubble over a long period of time, and in some instances such an air bubble reaches a nozzle. The presence of such thickened liquid or an air bubble inside a nozzle might result in poor liquid ejection therefrom. The maintenance unit 22 prevents or troubleshoots poor liquid ejection by performing maintenance operation of letting out such thickened liquid or air bubbles present inside nozzles of the liquid ejecting head 20 together with the liquid. As described here, not only during print operation but also during maintenance operation, the liquid ejecting head 20 consumes liquid supplied from the liquid supplying apparatus 30. Therefore, in the present embodiment, the operation of the liquid ejecting head 20 including print operation and maintenance operation will be referred to as liquid-consuming operation, which involves liquid consumption.

As illustrated in FIG. 1, the liquid ejecting apparatus 11 may be equipped with an operation panel 24 that is operated by the user. In this example, the facade which the user who operates the operation panel 24 faces with is the front of the liquid ejecting apparatus 11. The control unit 25 receives input information which the user enters by operating the operation panel 24. One of pieces of the input information is print instruction information for instructing the liquid ejecting apparatus 11 to execute liquid ejecting operation (for example, print operation). The operation panel 24 includes a power operation unit that is operated for turning the power of the liquid ejecting apparatus 11 ON/OFF. The operation panel 24 may include a display unit configured to display a menu and operation information of the liquid ejecting apparatus 11. In this case, the display unit may be a touch panel having an operation function.

The liquid ejecting apparatus 11 may be connected to a host apparatus 80 (see FIG. 4) such that communication can be performed therebetween. For example, the user instructs the liquid ejecting apparatus 11 to execute liquid ejecting operation (for example, print operation) by operating the input interface of the host apparatus 80. That is, based on the print instructions inputted via the operation panel 24 or sent from the host apparatus 80, the liquid ejecting apparatus 11 performs print operation to print an image onto the medium 14. The control unit 25 controls the liquid supplying apparatus 30, the liquid ejecting head 20, and the transportation unit 23. Upon receiving the print instructions, the control unit 25 controls the liquid ejecting head 20 and the transportation unit 23 to cause them to perform printing on the medium 14. In addition, the control unit 25 controls the liquid supplying apparatus 30 while the power of the liquid ejecting apparatus 11 is ON.

Liquid Supplying Apparatus

Figure 2:
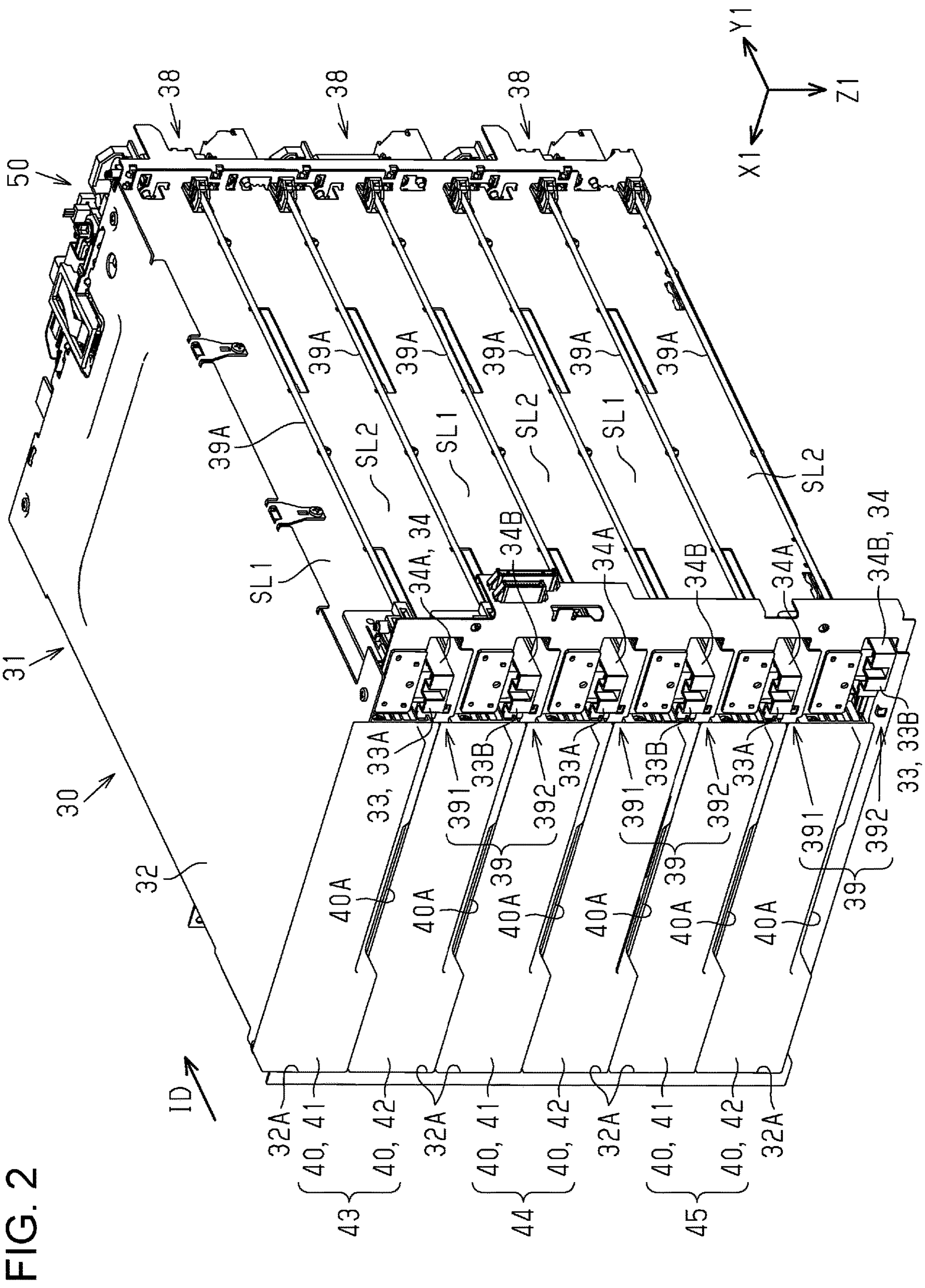
FIG. 2 is a front perspective view of a liquid supplying apparatus.
Figure 3:
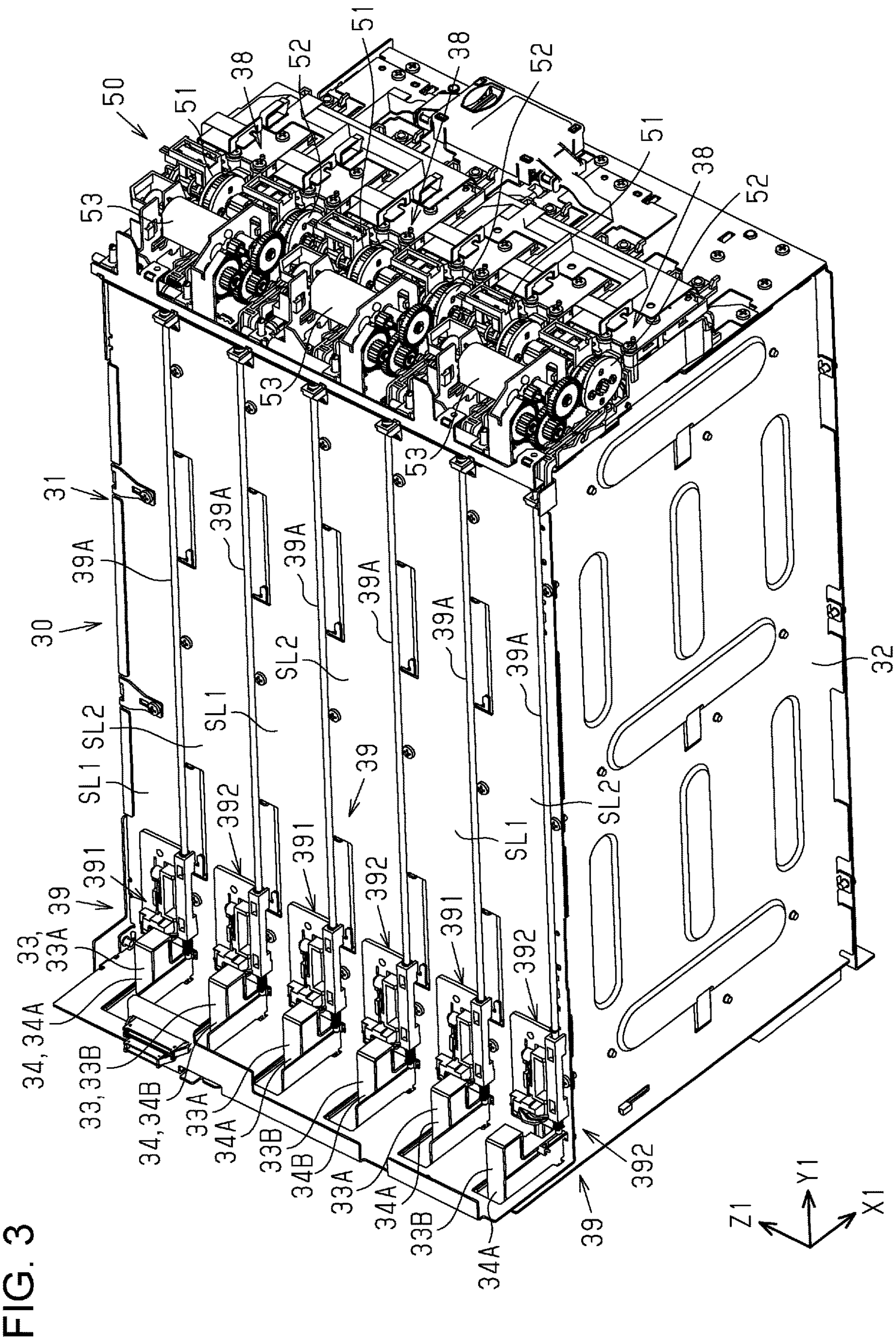
FIG. 3 is a rear perspective view of the liquid supplying apparatus.

Next, with reference to FIGS. 2 and 3, the structure of the liquid supplying apparatus 30 will now be explained in detail. The liquid supplying apparatus 30 is illustrated in FIGS. 2 and 3, with the exterior armor part of the housing case 32 detached. In the liquid supplying apparatus 30, the direction in which each liquid container 40 is mounted by insertion into the mounting unit 31 is defined as “insertion direction ID”, and the direction parallel to the insertion direction ID is defined as “depth direction Y1”. In the liquid supplying apparatus 30, when the mounting unit 31 is viewed from the front (insertion-opening side), the longitudinal direction of the facade of each liquid container 40 inserted therein is defined as “width direction X1”, and the direction in which the liquid containers 40 are arranged is defined as “arrangement direction Z1”. In this example, the width direction X1 is parallel to the width direction X of the liquid ejecting apparatus 11, and the depth direction Y1 is parallel to the depth direction Y of the liquid ejecting apparatus 11. The arrangement direction Z1 is parallel to the vertical direction Z. The faces of the housing case 32 are made up of a pair of sides, the top, the bottom, and the back.

The width direction X1, the depth direction Y1, and the arrangement direction Z1 of the liquid supplying apparatus 30 may be modified as may be necessary. The arrangement direction Z1, in which the liquid containers 40 mounted by insertion into the mounting unit 31 are arranged, may be different from the vertical direction Z. Although the liquid supplying apparatus 30 according to the example illustrated in FIGS. 2 and 3 has a vertical container-array configuration, meaning that the arrangement direction Z1 is parallel to the vertical direction Z, the liquid supplying apparatus 30 may have a horizontal container-array configuration, meaning that the arrangement direction Z1 is parallel to the width direction X of the liquid ejecting apparatus 11.

As illustrated in FIG. 2, the housing case 32 of the mounting unit 31 is compartmentalized into the plurality of slots 32A into which the plurality of liquid containers 40 can be put. The housing case 32 has a shape like a rectangular parallelepiped. The housing case 32 is able to house the plurality of liquid containers 40 inside, with the liquid containers 40 tiered in the arrangement direction Z1. The housing case 32 has, at its front, an insertion opening through which the plurality of liquid containers 40 can be inserted. The liquid containers 40 are inserted into the respective slots 32A through the insertion opening of the housing case 32. Each liquid container 40 has a low-profile rectangular-parallelepiped-like shape so that the liquid containers 40 can be mounted by insertion, in a state of being arranged in the arrangement direction Z1 of the housing case 32.

As illustrated in FIG. 2, the liquid container 40 has a grip portion 40A at a position of being exposed from the slot 32A when mounted by insertion. The user is able to hold the grip portion 40A with fingers and then attach or detach the liquid container 40. The liquid container 40 includes a container that has the grip portion 40A. The liquid container 40 further includes a liquid pack encased in the container. The container of the liquid container 40 may be configured to be repeatedly usable, and the user may replace the liquid pack alone with brand-new one. Alternatively, the liquid container 40 in its entirety, inclusive of the container, may be replaced with brand-new one. In the former case, the container may be a tray. The liquid container 40 may be a tank whose container having the grip portion 40A contains liquid.

As illustrated in FIG. 2, the engagement portion 33 includes an operation portion 34 configured to be operated by the user. The engagement portion 33 is movable to switch between an engagement state and a non-engagement state. When in the engagement state, the engagement portion 33 is in engagement with the liquid container 40 inserted in the slot 32A. When in the non-engagement state, the engagement portion 33 is not in engagement therewith. When the liquid container 40 needs to be replaced, the user operates the operation portion 34 to move the engagement portion 33 from an engagement state into a non-engagement state. Then, after replacing the liquid container 40 with brand-new one, the user operates the operation portion 34 to move the engagement portion 33 from a non-engagement state into an engagement state. The engagement portion 33 may be urged by an urging member such as a spring (not illustrated) in the direction of engagement with the liquid container 40.

As illustrated in FIG. 2, the mounting unit 31 is configured such that paired liquid containers 40 containing the same kind of liquid are mounted by insertion into it. Specifically, the mounting unit 31 is configured such that a first liquid container(s) 41, and a second liquid container(s) 42 containing the same kind of liquid as the liquid contained in the first liquid container 41, are mounted by insertion into it. As described here, there are two kinds of the liquid containers 40, namely, the first liquid container(s) 41 and the second liquid container(s) 42, containing the same kind of liquid. Therefore, for each kind of liquid, the plurality of slots 32A includes a first slot SL1, into which the first liquid container 41 is configured to be inserted, and a second slot SL2, into which the second liquid container 42 is configured to be inserted. The liquid ejecting apparatus 11 uses the first liquid container 41 and the second liquid container 42 while performing switching therebetween as the liquid supplying source from which the liquid is supplied to the liquid ejecting head 20. The mounting unit 31 illustrated in FIG. 2 includes a switching unit(s) 38 that performs this switching.

Let N be the maximum number of the liquid containers 40 that are able to be mounted by insertion into the mounting unit 31. Given this definition, N includes M pairs each consisting of the first liquid container 41 and the second liquid container 42 containing the same kind of liquid, as illustrated in FIG. 2. In the example illustrated in FIG. 2, there are M kinds of liquid that are able to be supplied to the liquid ejecting head 20, and there are the first liquid container 41 and the second liquid container 42 for each of the M kinds.

In the example illustrated in FIG. 2, the N liquid containers 40 include a first liquid container group 43 containing first liquid, a second liquid container group 44 containing second liquid, and a third liquid container group 45 containing third liquid. The first liquid container group 43 includes the first liquid container 41 and the second liquid container 42 containing the first liquid. The second liquid container group 44 includes the first liquid container 41 and the second liquid container 42 containing the second liquid. The third liquid container group 45 includes the first liquid container 41 and the second liquid container 42 containing the third liquid. If the liquid is ink, the kinds of the liquid are, for example, ink-color types. The first liquid, the second liquid, and the third liquid are ink having respective colors different from one another. For example, the first liquid, the second liquid, and the third liquid are cyan ink, magenta ink, and yellow ink. The ink-color types may be modified as may be necessary. The scope of the present disclosure is not limited to a configuration in which all of the N containers are constituents of plural pairs or sets each containing the same kind of liquid. It is sufficient as long as at least one pair or set containing the same kind of liquid is included.

The switching unit 38 illustrated in FIG. 2 performs switching to use either one of the first liquid container 41 and the second liquid container 42 as the liquid supplying source that is to be in communication with the liquid ejecting head 20. The switching unit 38 is controlled by the control unit 25. When one of the two liquid containers 40 that is currently used as the liquid supplying source, that is, the first liquid container 41 or the second liquid container 42, runs out of liquid (for example, runs out of ink), the switching unit 38 switches the liquid supplying source to the other of the two liquid containers 40.

As illustrated in FIG. 2, the liquid supplying apparatus 30 includes a movement restriction unit(s) 39. Linked with switching by the switching unit 38, the movement restriction unit 39 is able to restrict the movement of the first liquid container 41 and the second liquid container 42 selectively. The movement restriction unit 39 selectively switches the engagement portion 33 that is in an engagement state of being in engagement with the liquid container 40 between a restriction state and a non-restriction state. When in the restriction state, the movement of the engagement portion 33 from the engagement state into the non-engagement state is restricted. When in the non-restriction state, the movement of the engagement portion 33 from the engagement state into the non-engagement state is allowed. When in the restriction state, the movement restriction unit 39 locks the engagement portion 33 in the engagement state. The movement restriction unit 39 is controlled by the control unit 25.

As illustrated in FIGS. 2 and 3, the engagement portion 33 includes a first engagement portion 33A, which is able to be engaged with the first liquid container 41, and a second engagement portion 33B, which is able to be engaged with the second liquid container 42. The first engagement portion 33A includes a first operation portion 34A operable by the user for disengagement from the state of engagement with the first liquid container 41. The second engagement portion 33B includes a second operation portion 34B operable by the user for disengagement from the state of engagement with the second liquid container 42. As described here, the operation portion 34 includes the first operation portion 34A of the first engagement portion 33A and the second operation portion 34B of the second engagement portion 33B. The scope of the present disclosure is not limited to a configuration in which each operation portion 34A, 34B is formed integrally with the corresponding engagement portion 33A, 33B. Each operation portion 34A, 34B may be formed separately from the corresponding engagement portion 33A, 33B. To sum up, it is sufficient as long as each operation portion 34A, 34B is able to cause the corresponding engagement portion 33A, 33B to move between the engagement state and the non-engagement state.

The movement restriction unit 39 includes a first lock mechanism 391 configured to lock the first engagement portion 33A in the engagement state and a second lock mechanism 392 configured to lock the second engagement portion 33B in the engagement state. The first lock mechanism 391 is selectively switched between a restriction state (lock state) for restricting the movement of the first engagement portion 33A from the engagement state into the non-engagement state and a non-restriction state (unlock state) for allowing the movement of the first engagement portion 33A from the engagement state into the non-engagement state. The second lock mechanism 392 is selectively switched between a restriction state (lock state) for restricting the movement of the second engagement portion 33B from the engagement state into the non-engagement state and a non-restriction state (unlock state) for allowing the movement of the second engagement portion 33B from the engagement state into the non-engagement state.

When the first lock mechanism 391 is in the restriction state, the user is unable to operate the first operation portion 34A from the engagement state into the non-engagement state. Therefore, the user is unable to detach the first liquid container 41 from the first slot SL1. When the first lock mechanism 391 is in the non-restriction state, the user is able to operate the first operation portion 34A from the engagement state into the non-engagement state. Therefore, the user is able to detach the first liquid container 41 from the first slot SL1 and replaces it with brand-new one 41.

When the second lock mechanism 392 is in the restriction state, the user is unable to operate the second operation portion 34B from the engagement state into the non-engagement state. Therefore, the user is unable to detach the second liquid container 42 from the second slot SL2. When the second lock mechanism 392 is in the non-restriction state, the user is able to operate the second operation portion 34B from the engagement state into the non-engagement state. Therefore, the user is able to detach the second liquid container 42 from the second slot SL2 and replaces it with brand-new one 42.

In the present embodiment, hot swapping is adopted. Hot swapping is a scheme in which the movement of one of two liquid containers 41 and 42 containing the same kind of liquid is restricted so that this one is not replaceable during liquid-consuming operation when this one is currently used as the liquid supplying source, whereas the movement of the other, which is not currently used, is not restricted so that the other is replaceable during the liquid-consuming operation. Since hot swapping is adopted, the other of the two liquid containers 41 and 42, which is not currently used, is able to be replaced even during liquid-consuming operation. Therefore, even if the above-mentioned one of the two liquid containers 41 and 42, which is currently used, runs out of the liquid, switching the liquid supplying source to the other makes it possible to continue print operation, without any interruption for the purpose of replacement of the liquid container 40.

As illustrated in FIG. 3, to realize hot swapping, the mounting unit 31 includes a supply mechanism 50. The supply mechanism 50 includes the aforementioned switching unit 38 and the movement restriction unit 39. When the currently-active one, meaning the one that is currently used, of the first liquid container 41 and the second liquid container 42 configured to contain the same kind of liquid runs out of the liquid, the switching unit 38 performs switching so as to use the other as a new currently-active source. That is, the switching unit 38 performs selective switching between the first liquid container 41 and the second liquid container 42 as to whether to allow or not allow the supplying of the liquid. One of the first engagement portion 33A and the second engagement portion 33B corresponds to the liquid container 40 that is currently used, and the other corresponds to the liquid container 40 that is not currently used; the movement restriction unit 39 locks this one in the engagement state and unlocks the other.

As illustrated in FIGS. 2 and 3, the supply mechanism 50 includes a first driving mechanism 51, which constitutes the switching unit 38, a second driving mechanism 52, which constitutes the movement restriction unit 39, and a driving source 53 configured to output motive power to the first driving mechanism 51 and the second driving mechanism 52. The second driving mechanism 52 includes a rod 39A for transmitting, to the engagement portion 33A, 33B, motive power for performing lock operation of locking the engagement portion 33A, 33B in the engagement state and unlock operation of unlocking the lock. The rod 39A extends linearly in the depth direction Y1 along a side of the housing case 32 inside each of the slots SL1 and SL2.

Schematic Configuration of Liquid Ejecting Apparatus

Figure 4:
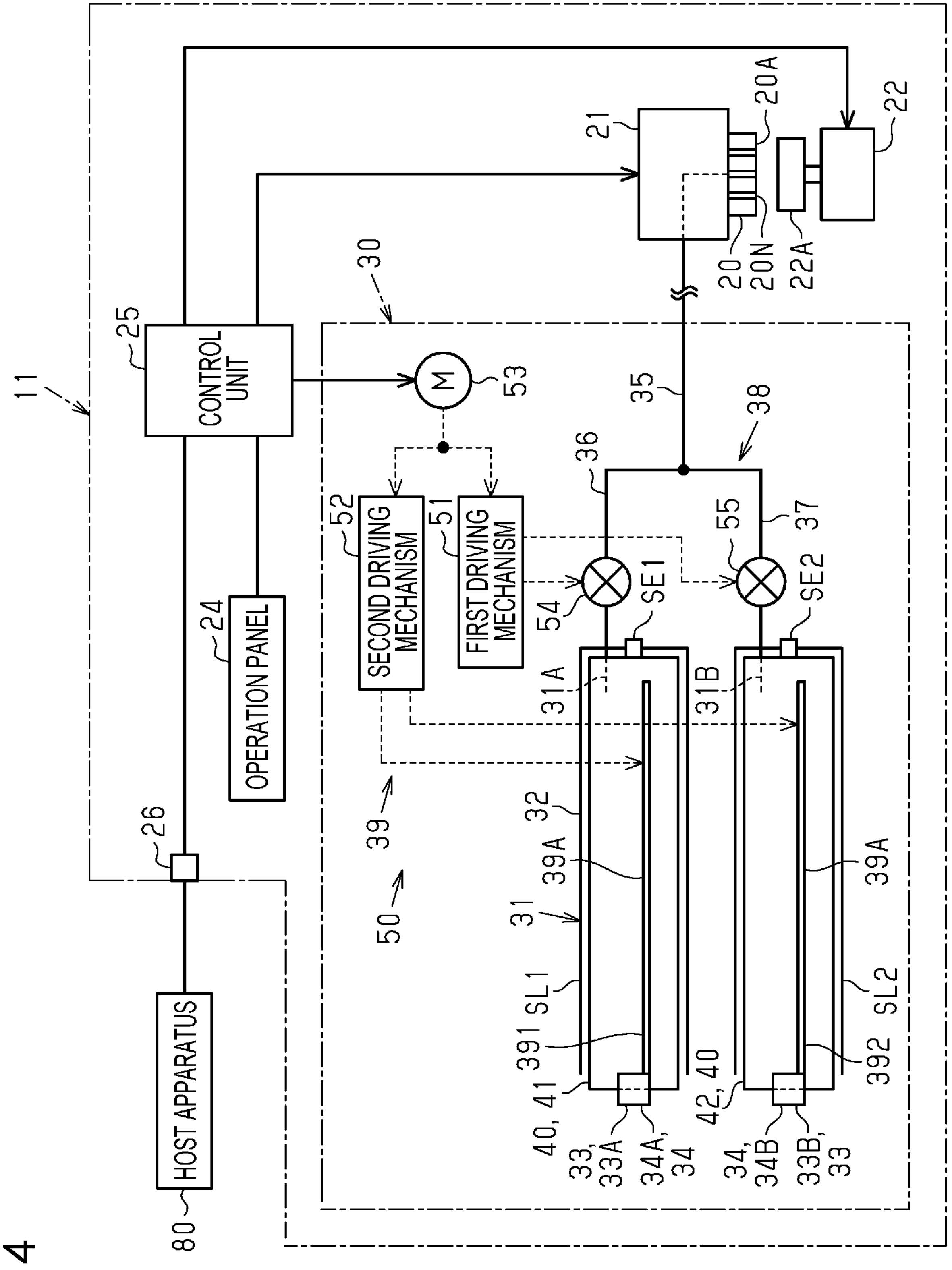
FIG. 4 is a schematic diagram illustrating a schematic configuration of the liquid ejecting apparatus.

Next, with reference to FIG. 4, the schematic configuration of the liquid ejecting apparatus 11 equipped with the liquid supplying apparatus 30 will now be explained. Note that only a single set (pair) containing the same kind of liquid, among the plural sets (pairs) of liquid containers 41 and 42, is illustrated in FIG. 4. In this example, the number of liquid containers containing the same kind of liquid in each set (pair) is two.

The first liquid container 41 and the second liquid container 42 illustrated in FIG. 4 contain the same kind of liquid. Although a single pair only is illustrated in FIG. 4, plural pairs each made up of the first liquid container 41 and the second liquid container 42 containing the same kind of liquid are provided. For example, if the liquid is ink, the first liquid container 41 and the second liquid container 42 are provided for each of the colors of the ink such as cyan, magenta, and yellow. That is, the liquid containers include the first liquid container 41 and the second liquid container 42 containing cyan liquid, the first liquid container 41 and the second liquid container 42 containing magenta liquid, and the first liquid container 41 and the second liquid container 42 containing yellow liquid (see FIGS. 2 and 3). The number of the pairs each made up of the first liquid container 41 and the second liquid container 42 is not limited to three. This number may be two, or four or more. A pair made up of the first liquid container 41 and the second liquid container 42 containing black liquid may be included.

The first liquid container 41 is inserted into the first slot SL1. The second liquid container 42 is inserted into the second slot SL2. The liquid supplying apparatus 30 includes a first sensor SE1 configured to detect the presence of the first liquid container 41 in the first slot SL1 and a second sensor SE2 configured to detect the presence of the second liquid container 42 in the second slot SL2. Based on a detection signal inputted from the first sensor SE1, the control unit 25 determines whether there is the first liquid container 41 in the first slot SL1 or not. Based on a detection signal inputted from the second sensor SE2, the control unit 25 determines whether there is the second liquid container 42 in the second slot SL2 or not. The control unit 25 includes a sensor configured to detect that the first engagement portion 33A is in the engagement state (not illustrated) and a sensor configured to detect that the second engagement portion 33B is in the engagement state (not illustrated). Based on the detection results of these sensors, the control unit 25 determines individually whether the first engagement portion 33A is in the engagement state or not and whether the second engagement portion 33B is in the engagement state or not.

As illustrated in FIG. 4, the liquid supplying apparatus 30 includes the supply flow passage 35, which is in communication with the liquid ejecting head 20, a first supply flow passage 36 for communication between the first liquid container 41 and the supply flow passage 35, and a second supply flow passage 37 for communication between the second liquid container 42 and the supply flow passage 35. The liquid supplying apparatus 30 includes the aforementioned switching unit 38 capable of switching the flow passage that is in communication with the supply flow passage 35, between the first supply flow passage 36 and the second supply flow passage 37. The liquid supplying apparatus 30 includes the aforementioned movement restriction unit 39 capable of, linked with switching by the switching unit 38, restricting the movement of the first liquid container 41 and the second liquid container 42 selectively.

The mounting unit 31 includes a first connection portion 31A configured to be connected to the first liquid container 41 inserted in the first slot SL1 and a second connection portion 31B configured to be connected to the second liquid container 42 inserted in the second slot SL2. The connection portion 31A, 31B protrudes like a needle from the rear inner surface inside the slot SL1, SL2. The first liquid container 41 has a liquid supply outlet (not illustrated) on its end face in the insertion direction ID. When the first liquid container 41 that is being inserted comes to a position for attachment to the first slot SL1, the needle-like first connection portion 31A is inserted into the liquid supply outlet. This needle insertion brings the first liquid container 41 into communication with the first supply flow passage 36. The second liquid container 42 has a liquid supply outlet (not illustrated) on its end face in the insertion direction ID. When the second liquid container 42 that is being inserted comes to a position for attachment to the second slot SL2, the needle-like second connection portion 31B is inserted into the liquid supply outlet. This needle insertion brings the second liquid container 42 into communication with the second supply flow passage 37.

When the switching unit 38 causes the first supply flow passage 36 to be in communication with the supply flow passage 35, the movement restriction unit 39 restricts the movement of the first liquid container 41. When the switching unit 38 causes the second supply flow passage 37 to be in communication with the supply flow passage 35, the movement restriction unit 39 restricts the movement of the second liquid container 42.

The switching unit 38 includes a first on-off valve 54 for opening and closing the first supply flow passage 36, a second on-off valve 55 for opening and closing the second supply flow passage 37, and the first driving mechanism 51 for switching between the opening and closing of the first on-off valve 54 and the second on-off valve 55. The switching unit 38 switches the flow passage that is in communication with the supply flow passage 35, between the first supply flow passage 36 and the second supply flow passage 37. The control unit 25 stores, into a non-illustrated memory (storage unit), use information for identifying which one of the first liquid container 41 and the second liquid container 42 is to be used. Based on the use information, the control unit 25 opens the one, of the first on-off valve 54 and the second on-off valve 55, identified as the valve that is to be used and closes the other. When the one of the first liquid container 41 and the second liquid container 42 that is active for use (currently used) runs out of liquid, on condition that a necessary amount of liquid is contained in the other, for example, if the other is a brand-new liquid container, the liquid container 40 to be used is switched from the one to the other by putting the other into use. The liquid container 41, 42 includes a non-illustrated storage element configured to store liquid information, including information about the kind of the liquid contained inside and the amount of the liquid left. By reading the liquid information out of each storage element of the liquid container 41, 42 inserted in the slot SL1, SL2, the control unit 25 obtains the information about the kind of the liquid contained in the liquid container 41, 42 (for example, ink color) and the amount of the liquid left.

When the switching unit 38 causes the first supply flow passage 36 to be in communication with the supply flow passage 35, the first liquid container 41 is in communication with the liquid ejecting head 20 via the first supply flow passage 36 and the supply flow passage 35. Therefore, the liquid is supplied from the first liquid container 41 to the liquid ejecting head 20. When the switching unit 38 causes the second supply flow passage 37 to be in communication with the supply flow passage 35, the second liquid container 42 is in communication with the liquid ejecting head 20 via the second supply flow passage 37 and the supply flow passage 35. Therefore, the liquid is supplied from the second liquid container 42 to the liquid ejecting head 20.

The control unit 25 controls the carriage 21 and the liquid ejecting head 20. By controlling the driving of a non-illustrated carriage motor, the control unit 25 causes the carriage 21 to reciprocate in the width direction X. The liquid ejecting head 20 includes a plurality of nozzles 20N capable of ejecting the liquid supplied from the one of the first liquid container 41 and the second liquid container 42 that is currently used. During print operation, the control unit 25 causes the liquid ejecting head 20 to eject the liquid from its nozzles 20N toward the medium 14 (see FIG. 1) while the carriage 21 moves.

In addition, the control unit 25 controls the maintenance unit 22. The maintenance unit 22 includes a cap 22A. The maintenance unit 22 performs cleaning as one of maintenance operations. The cleaning is operation of discharging liquid from the nozzles 20N of the liquid ejecting head 20 forcibly. The cleaning may be pressure cleaning or suction cleaning. In the suction cleaning, the cap 22A is brought into contact with a nozzle surface 20A, in which the nozzles 20N of the liquid ejecting head 20 are formed, so as to form a closed space between the nozzle surface 20A and the cap 22A, and the pressure of the closed space is made negative by driving a non-illustrated suction pump. Due to the negative pressure, the liquid is discharged from the nozzles 20N forcibly. In the pressure cleaning, the liquid contained in the one of the first liquid container 41 and the second liquid container 42 that is currently used is pressurized using pressure applied by a pressure pump, thereby discharging the liquid from the nozzles 20N of the liquid ejecting head 20 forcibly. The liquid (waste liquid) discharged from the nozzles 20N in the process of the cleaning is collected into a non-illustrated waste liquid tank via the cap 22A.

As illustrated in FIG. 4, the movement restriction unit 39 includes the first engagement portion 33A, which is able to be engaged with the first liquid container 41, the second engagement portion 33B, which is able to be engaged with the second liquid container 42, and the second driving mechanism 52 for selective switching between the restriction state and the non-restriction state of the first engagement portion 33A and the second engagement portion 33B. The movement restriction unit 39 restricts the movement of the first liquid container 41 in a detachment direction from an inserted state by locking the first engagement portion 33A at an engagement position where the first engagement portion 33A is engaged with the first liquid container 41. The movement restriction unit 39 restricts the movement of the second liquid container 42 in a detachment direction from an inserted state by locking the second engagement portion 33B at an engagement position where the second engagement portion 33B is engaged with the second liquid container 42.

A more detailed explanation is given below. The second driving mechanism 52 includes the aforementioned first lock mechanism 391 and the aforementioned second lock mechanism 392 (see FIG. 3). The first lock mechanism 391 restricts the removal of the first liquid container 41 from the first slot SL1 by locking the first engagement portion 33A engaged with the first liquid container 41. The second lock mechanism 392 restricts the removal of the second liquid container 42 from the second slot SL2 by locking the second engagement portion 33B engaged with the second liquid container 42.

If the amount of the liquid left in the one, of the first liquid container 41 and the second liquid container 42, whose movement is restricted by the movement restriction unit 39 becomes smaller than a predetermined threshold, the control unit 25 switches the flow passage that is in communication with the supply flow passage 35. In addition to this flow-passage switching, the control unit 25 cancels the restriction on the movement of the one, of the first liquid container 41 and the second liquid container 42, whose movement has been restricted by the movement restriction unit 39, and causes the movement restriction unit 39 to restrict the movement of the other.

Specifically, if the amount of the liquid left in the first liquid container 41 whose movement is restricted by the movement restriction unit 39 becomes smaller than a predetermined threshold, the control unit 25 switches the flow passage that is in communication with the supply flow passage 35. In addition to this flow-passage switching, the control unit 25 cancels the restriction on the movement of the first liquid container 41 and causes the movement restriction unit 39 to restrict the movement of the second liquid container 42. If the amount of the liquid left in the second liquid container 42 whose movement is restricted by the movement restriction unit 39 becomes smaller than a predetermined threshold, the control unit 25 switches the flow passage that is in communication with the supply flow passage 35. In addition to this flow-passage switching, the control unit 25 cancels the restriction on the movement of the second liquid container 42 and causes the movement restriction unit 39 to restrict the movement of the first liquid container 41.

Premised on that the movement of either one of the first liquid container 41 and the second liquid container 42 is not restricted by the movement restriction unit 39, if this non-restricted one is replaced with a new liquid container 40, the control unit 25 switches the flow passage that is in communication with the supply flow passage 35. In addition to this flow-passage switching, the control unit 25 cancels the restriction on the movement of the other of the liquid containers 40 and causes the movement restriction unit 39 to restrict the movement of this new liquid container 40.

Specifically, if the first liquid container 41 whose movement is not restricted by the movement restriction unit 39 is replaced with a new first liquid container 41, the control unit 25 switches the flow passage that is in communication with the supply flow passage 35 from the second supply flow passage 37 to the first supply flow passage 36. In addition to this flow-passage switching, the control unit 25 cancels the restriction on the movement of the second liquid container 42 and causes the movement restriction unit 39 to restrict the movement of this new first liquid container 41. The switching of the flow passage that is in communication with the supply flow passage 35 from the second supply flow passage 37 to the first supply flow passage 36 and the restricting of the movement of the new first liquid container 41 may be executed when the amount of the liquid left in the second liquid container 42 becomes smaller than a predetermined threshold after the replacement with the new first liquid container 41.

If the second liquid container 42 whose movement is not restricted by the movement restriction unit 39 is replaced with a new second liquid container 42, the control unit 25 switches the flow passage that is in communication with the supply flow passage 35 from the first supply flow passage 36 to the second supply flow passage 37. In addition to this flow-passage switching, the control unit 25 cancels the restriction on the movement of the first liquid container 41 and causes the movement restriction unit 39 to restrict the movement of this new second liquid container 42. The switching of the flow passage that is in communication with the supply flow passage 35 from the first supply flow passage 36 to the second supply flow passage 37 and the restricting of the movement of the new second liquid container 42 may be executed when the amount of the liquid left in the first liquid container 41 becomes smaller than a predetermined threshold after the replacement with the new second liquid container 42.

As illustrated in FIG. 4, the liquid supplying apparatus 30 includes the driving source 53 configured to drive the first driving mechanism 51 and the second driving mechanism 52. By causing the driving source 53 to perform drive operation, the control unit 25 controls the driving of the two on-off valves 54 and 55, which constitute the switching unit 38, and the two lock mechanisms 391 and 392, which constitute the movement restriction unit 39. An example of the driving source 53 is an electric motor. The driving source 53 is not limited to an electric motor. For example, the driving source 53 may be an electric cylinder or a solenoid.

As illustrated in FIG. 4, the operation panel 24 is electrically connected to the control unit 25. The liquid ejecting apparatus 11 includes a communication unit 26 for connection to the host apparatus 80 communicably. The control unit 25 is connected to the host apparatus 80 communicably via the communication unit 26. The user is able to give instructions to the liquid ejecting apparatus 11 by operating the operation panel 24. In addition, the user is able to give instructions to the liquid ejecting apparatus 11 also by operating the input unit of the host apparatus 80. These instructions include instructions for liquid-consuming operation, which involves liquid consumption.

The instructions for liquid-consuming operation include print instructions and maintenance instructions. The print instructions instruct the liquid ejecting head 20 to perform printing on the medium 14 by ejecting liquid such as ink toward the medium 14. The maintenance instructions instruct that cleaning, in which liquid is discharged from the nozzles 20N forcibly, be performed. More specifically, the maintenance instructions are instructions for cleaning the nozzles 20N by discharging liquid with increased viscosity inside the nozzles 20N and air bubbles contained in the liquid from the nozzles 20N together with the liquid.

When print instructions are received via the operation panel 24 or from the host apparatus 80, the control unit 25 controls the liquid ejecting head 20 and the transportation unit 23 to cause them to print an image or a text on the medium 14.

The control unit 25 further controls the timing of maintenance execution. The control unit 25 manages the time that has elapsed from the last maintenance execution and the number of sheets that have been printed since the last maintenance execution. When the elapsed time exceeds a time threshold, the control unit 25 causes the maintenance unit 22 to perform maintenance operation. When the number of sheets that have been printed exceeds a number-of-sheets threshold, the control unit 25 causes the maintenance unit 22 to perform maintenance operation. When maintenance instructions are received via the operation panel 24 or from the host apparatus 80, the control unit 25 causes the maintenance unit 22 to perform maintenance operation. The maintenance operation may be operation other than cleaning. For example, the maintenance operation may be idle discharging (flushing) of liquid from the nozzles 20N of the liquid ejecting head 20.

Figure 12:
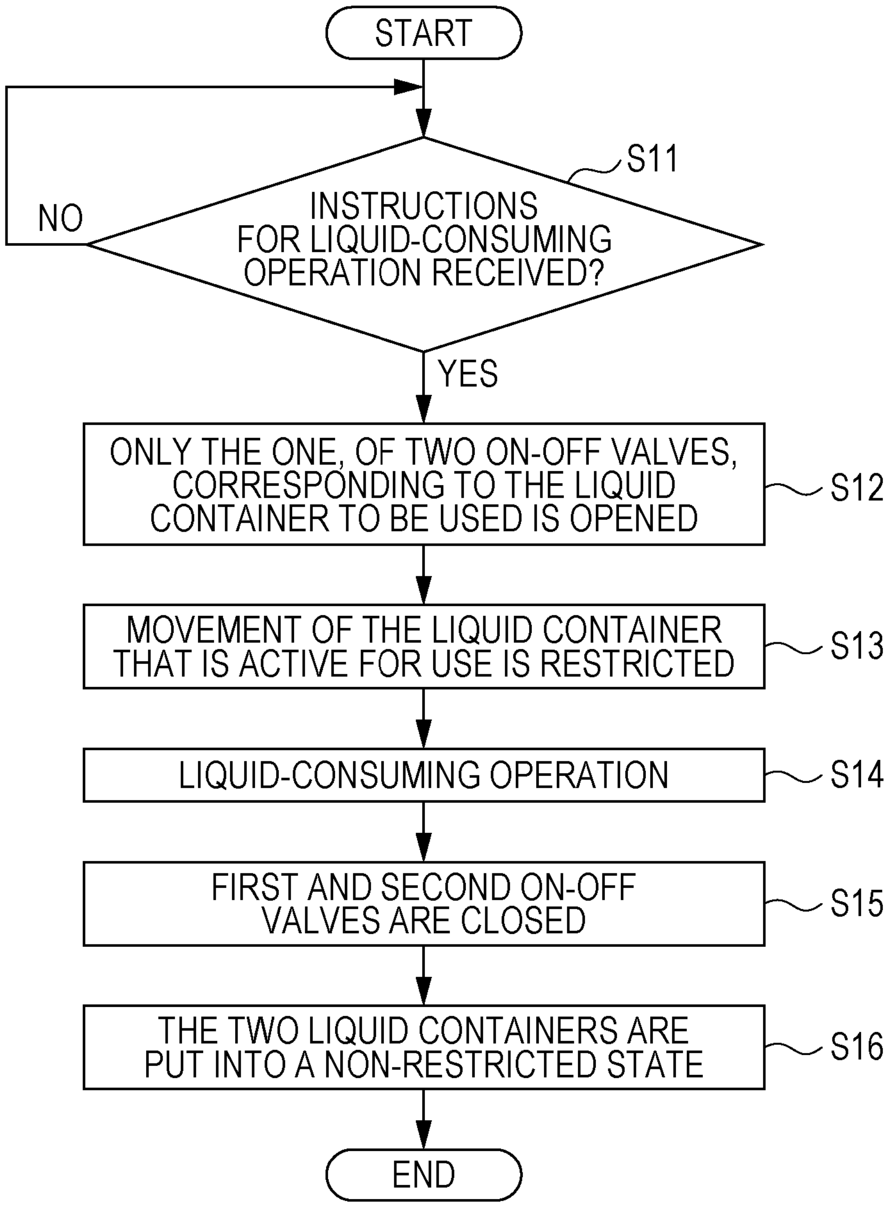
FIG. 12 is a flowchart of liquid supply control processing.

The control unit 25 configured to control the operation of the liquid ejecting apparatus 11 includes, for example, a CPU, a memory, and so forth. By running a program stored in the memory by the CPU, the control unit 25 controls the components the liquid ejecting apparatus 11 such as the liquid ejecting head 20, the liquid supplying apparatus 30, the maintenance unit 22, the transportation unit 23, and so forth. For example, in the control unit 25 according to this example, a program illustrated by the flowchart in FIG. 12 is stored in its memory.

Structure of Supply Mechanism 50

Next, with reference to FIGS. 5 to 8, the structure of the supply mechanism 50 will now be explained.

Figure 5:
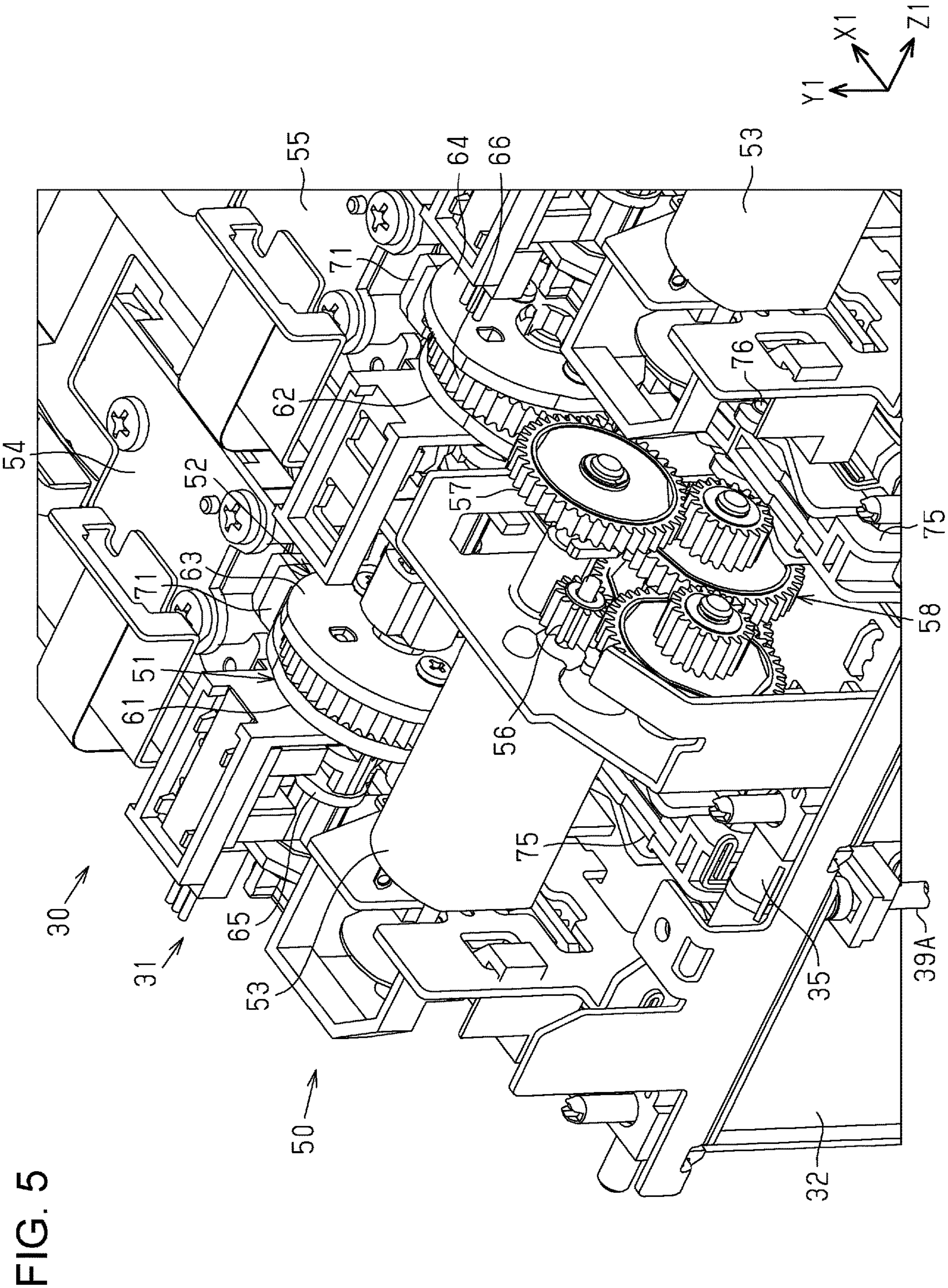
FIG. 5 is a partial perspective view of a supply mechanism.

As illustrated in FIG. 5, the supply mechanism 50 includes the driving source 53, and the first driving mechanism 51 and the second driving mechanism 52, each of which is driven by motive power outputted from the driving source 53. More specifically, the supply mechanism 50 includes the driving source 53, a gear train 58 configured to transmit rotational power outputted from the driving source 53, and a plurality of cams 61 to 64 configured to rotate based on the rotational power transmitted by the gear train 58. The cams 61 to 64 are fixed to a common shaft portion 65 supported rotatably. The cams 61 to 64 are fixed with predetermined phase differences therebetween to the shaft portion 65. The gear train 58 includes an input gear 56 and an output gear 57. The input gear 56 is fixed to the output shaft of the driving source 53. The output gear 57 is located on the downstream end on the power transmission path of the gear train 58.

The first driving mechanism 51 includes the first cam 61 and the second cam 62. The first cam 61 is mounted on the shaft portion 65 configured to rotate when driven indirectly by and in synchronization with driving by the driving source 53. The first cam 61 is capable of switching the first on-off valve 54 between an open state and a closed state. The second cam 62 is mounted on the shaft portion 65 and is capable of switching the second on-off valve 55 between an open state and a closed state.

Figures 8, 9:
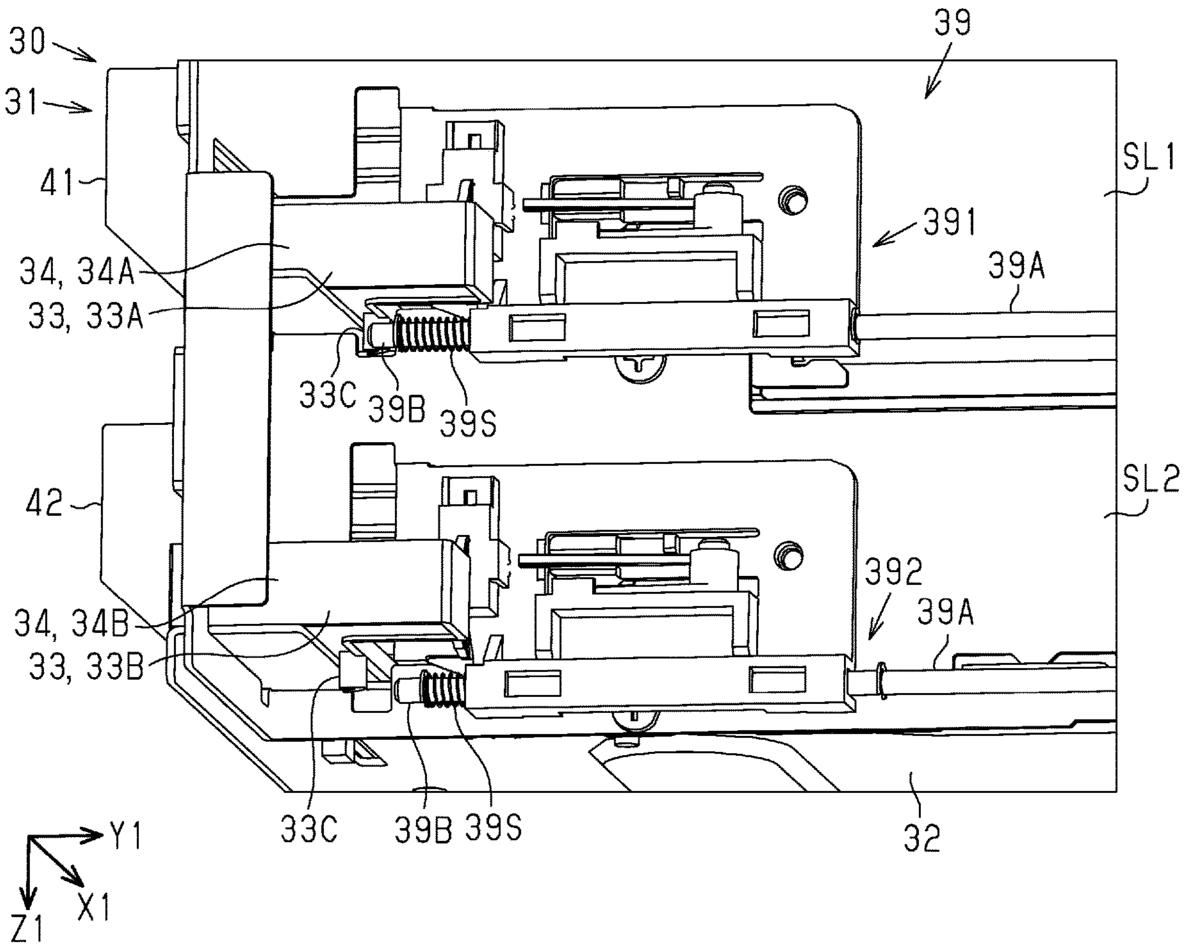
FIG. 8 is a partial perspective view of a second driving mechanism.
FIG. 9 is a state transition table illustrating transition between states of the supply mechanism.

The second driving mechanism 52 includes the third cam 63, which is mounted on the shaft portion 65 and is capable of switching the state of the first engagement portion 33A (see FIGS. 3 and 8), and the fourth cam 64, which is mounted on the shaft portion 65 and is capable of switching the state of the second engagement portion 33B (see FIGS. 3 and 8).

The output gear 57 illustrated in FIG. 5 is in meshing engagement with a gear portion 66, which is provided between the third cam 63 and the fourth cam 64 in such a way as to be able to rotate integrally with them. Therefore, the first cam 61, the second cam 62, the third cam 63, and the fourth cam 64, which are fixed to the shaft portion 65, rotate integrally due to the rotation of the shaft portion 65 by the transmission of the motive power of the driving source 53 via the gear train 58.

Figure 6:
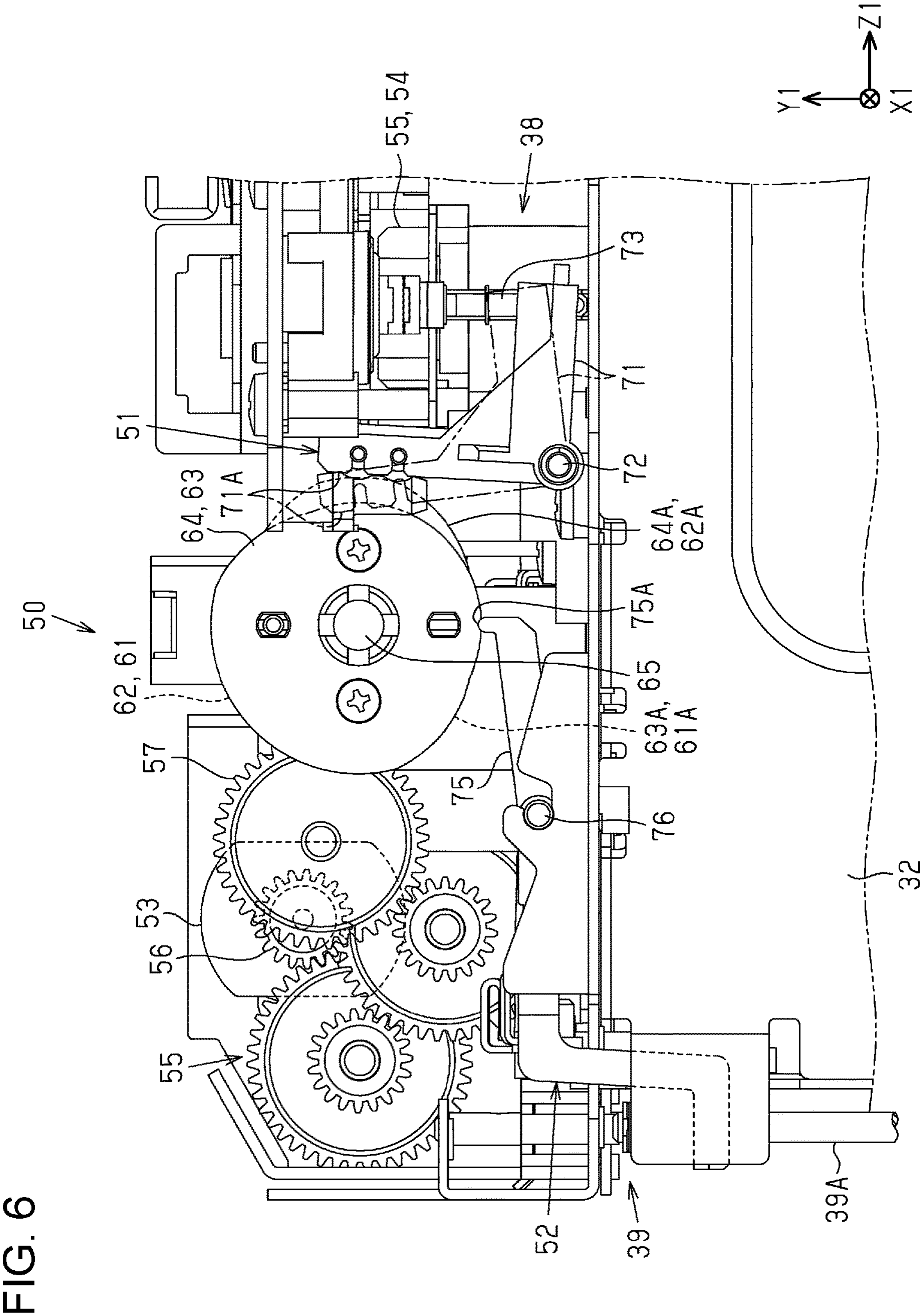
FIG. 6 is a partial side view of the supply mechanism.

As illustrated in FIG. 6, the first cam 61 has a cam face 61A formed on its outer periphery, and the second cam 62 has a cam face 62A formed on its outer periphery. The cam face 61A is configured to mechanically act on a sliding surface 71A of a first lever 71 corresponding to the first cam 61, and the cam face 62A is configured to mechanically act on a sliding surface 71A of a first lever 71 corresponding to the second cam 62. The first lever 71 has, for example, a shape like a letter L in a side view and is able to rotate within a predetermined angular range around its fulcrum 72. By mechanically acting on the sliding surface 71A of the first lever 71, the first cam 61 switches the first on-off valve 54 between an open state and a closed state through the rotation of the first cam 61. By mechanically acting on another first lever 71 different from the first lever 71 on which the first cam 61 is configured to mechanically act, the second cam 62 switches the second on-off valve 55 between an open state and a closed state through the rotation of the second cam 62.

A drive shaft 73 configured to switch each of the first on-off valve 54 and the second on-off valve 55 between an open state and a closed state is each coupled to the other end portion that is the opposite of one end portion where the sliding surface 71A of each first lever 71 is located. Each of the first on-off valve 54 and the second on-off valve 55 is switched between an open state and a closed state individually by the driving of the drive shaft 73 in an axial direction. A relationship between the rotational position of the first cam 61, the rotational position of the second cam 62, the open/closed state of the first on-off valve 54, and the open/closed state of the second on-off valve 55 will be described later.

As illustrated in FIGS. 5 and 6, the third cam 63 has a cam face 63A formed on its outer periphery, and the fourth cam 64 has a cam face 64A formed on its outer periphery. The cam face 63A is configured to mechanically act on a sliding surface 75A of a second lever 75 corresponding to the third cam 63, and the cam face 64A is configured to mechanically act on a sliding surface 75A of a second lever 75 corresponding to the fourth cam 64 (see FIG. 6). As illustrated in FIG. 6, the second lever 75 has, for example, a shape like a letter L in a side view and is able to rotate within a predetermined angular range around its fulcrum 76. By mechanically acting on the sliding surface 75A of the second lever 75, the third cam 63 causes a rod 39A to change in position in an axial direction through the rotation of the third cam 63. By mechanically acting on another second lever 75 different from the second lever 75 on which the third cam 63 is configured to mechanically act, the fourth cam 64 causes a rod 39A to change in position in an axial direction through the rotation of the fourth cam 64.

The base end portion of the rod 39A is each coupled to the other end portion that is the opposite of one end portion where the sliding surface 75A of each second lever 75 is located. The change in position of the rod 39A in the axial direction switches the engagement portion 33A, 33B (see FIG. 8) between a restriction state (lock state) for restricting the movement of the liquid container 40 and a non-restriction state (unlock state) for not restricting the movement of the liquid container 40. A relationship between the rotational position of the third cam 63, the rotational position of the fourth cam 64, the state of the engagement portion 33A, and the state of the engagement portion 33B will be described later.

Figure 7:
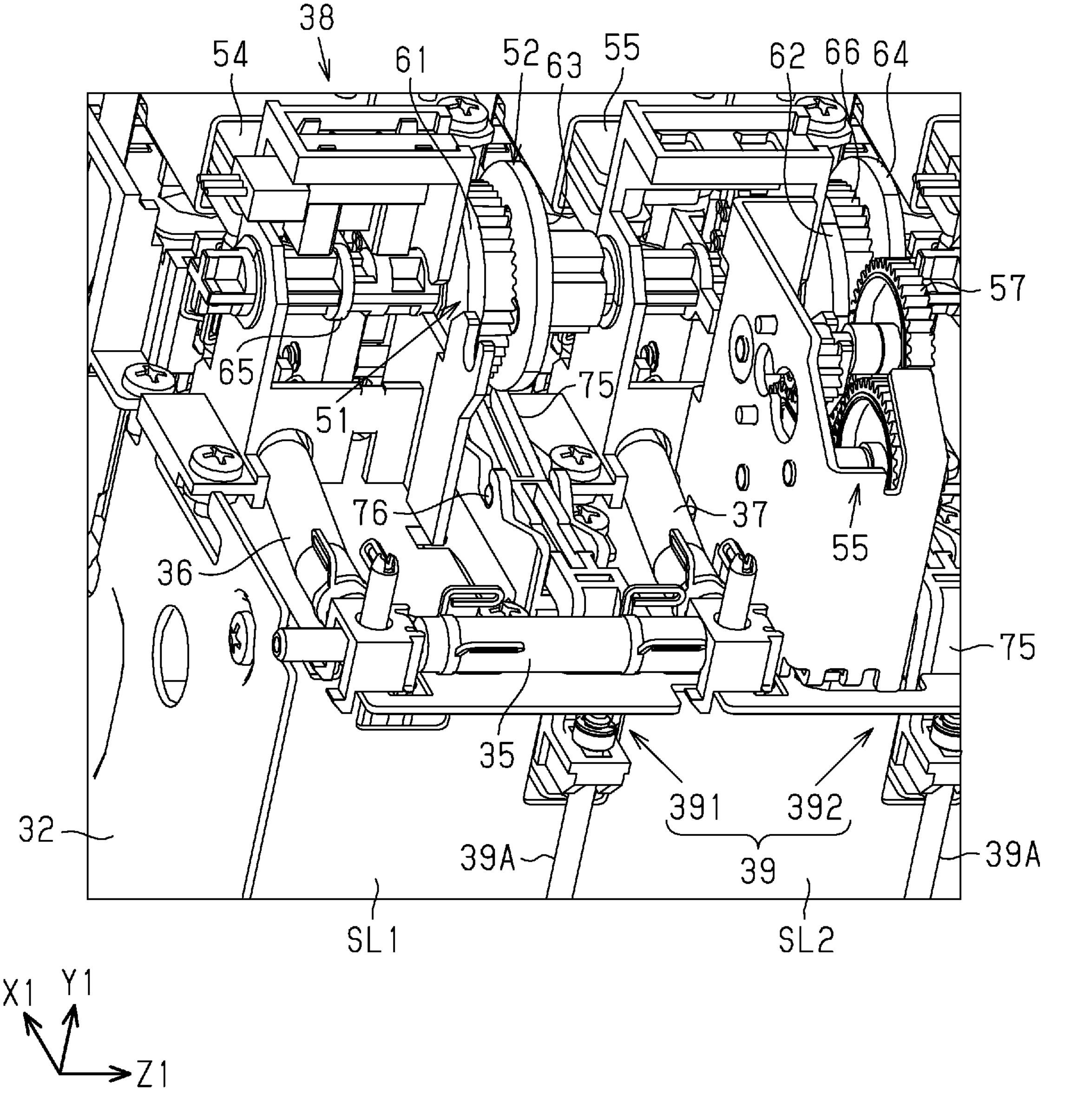
FIG. 7 is another partial perspective view of the supply mechanism.

As illustrated in FIG. 7, the supply mechanism 50 includes the first supply flow passage 36, which is in communication with the first on-off valve 54, the second supply flow passage 37, which is in communication with the second on-off valve 55, and the supply flow passage 35 as a common passage with which the first supply flow passage 36 and the second supply flow passage 37 are in communication. Though not illustrated in FIG. 7, also in a portion for supplying other kind of liquid, the first supply flow passage 36, which is in communication with the first on-off valve 54, the second supply flow passage 37, which is in communication with the second on-off valve 55, and the supply flow passage 35 are provided. Different kinds of liquid are supplied to the liquid ejecting head 20 respectively through non-illustrated tubes or the like (see FIG. 1) of the plurality of supply flow passages 35. As illustrated in FIG. 7, the movement restriction unit 39 includes the first lock mechanism 391 configured to restrict the movement of the first liquid container 41 inserted in the first slot SL1 and the second lock mechanism 392 configured to restrict the movement of the second liquid container 42 inserted in the second slot SL2.

As illustrated in FIG. 8, an urging member 39S such as a spring for urging the rod 39A is provided on the head end portion of the rod 39A. The first lock mechanism 391 shown on the upper side in FIG. 8 is in a restriction state. The second lock mechanism 392 shown on the lower side in FIG. 8 is in a non-restriction state (restriction-canceled state).

Due to the urging force of the urging member 39S, the rod 39A is positioned to a restriction position, as indicated by the first lock mechanism 391 shown on the upper side in FIG. 8. When the rod 39A is located at the restriction position, the head end portion 39B of the rod 39A is in engagement with a restriction portion 33C extending from the engagement portion 33. Since the rod 39A restricts the movement of the restriction portion 33C, operation for moving the engagement portion 33 from an engagement state into a non-engagement state is restricted. That is, the user is not allowed to move the operation portion 34 from an engagement state, in which the liquid container 40 cannot be detached, into a non-engagement state, in which the liquid container 40 can be detached. Therefore, the user is unable to detach the liquid container 40.

When the second cam 62 or the fourth cam 64 pushes the second lever 75, the rod 39A is positioned to a restriction-canceled position against the urging force of the urging member 39S, as indicated by the second lock mechanism 392 shown on the lower side in FIG. 8. When the rod 39A is located at the restriction-canceled position, the head end portion 39B of the rod 39A is retracted to an extent that it is not in engagement with the restriction portion 33C extending from the engagement portion 33. Since the rod 39A does not restrict the movement of the restriction portion 33C, the user is able to move (operate) the engagement portion 33 from an engagement state into a non-engagement state. That is, the user is able to detach the liquid container 40 by moving the operation portion 34 from an engagement state, in which the liquid container 40 cannot be detached, into a non-engagement state, in which the liquid container 40 can be detached.

States of On-Off Valves and Lock Mechanisms

With reference to FIG. 9, three possible states based on combinations of switching of the on-off valves 54 and 55 and the lock mechanisms 391 and 392 will now be explained.

As illustrated in FIG. 9, the first on-off valve 54 switches the first supply flow passage 36, which is in communication with the first liquid container 41 inserted in the first slot SL1, between an open state and a closed state. The second on-off valve 55 switches the second supply flow passage 37, which is in communication with the second liquid container 42 inserted in the second slot SL2, between an open state and a closed state. The first lock mechanism 391 is switchable between a lock state, in which the movement of the first liquid container 41 inserted in the first slot SL1 is restricted, and an unlock state, in which the movement of the first liquid container 41 inserted in the first slot SL1 is not restricted. The second lock mechanism 392 is switchable between a lock state, in which the movement of the second liquid container 42 inserted in the second slot SL2 is restricted, and an unlock state, in which the movement of the second liquid container 42 inserted in the second slot SL2 is not restricted.

As illustrated in FIG. 9, based on combinations of switching of the on-off valves 54 and 55 and the lock mechanisms 391 and 392, there are three possible states: "State 1", "State 2", and "State 3". In "State 1", the first on-off valve 54 is open, the second on-off valve 55 is closed, the first lock mechanism 391 is in a lock state, and the second lock mechanism 392 is in an unlock state. In "State 2", the first on-off valve 54 is closed, the second on-off valve 55 is closed, the first lock mechanism 391 is in an unlock state, and the second lock mechanism 392 is in an unlock state. In "State 3", the first on-off valve 54 is closed, the second on-off valve 55 is open, the first lock mechanism 391 is in an unlock state, and the second lock mechanism 392 is in a lock state.

Figure 10:
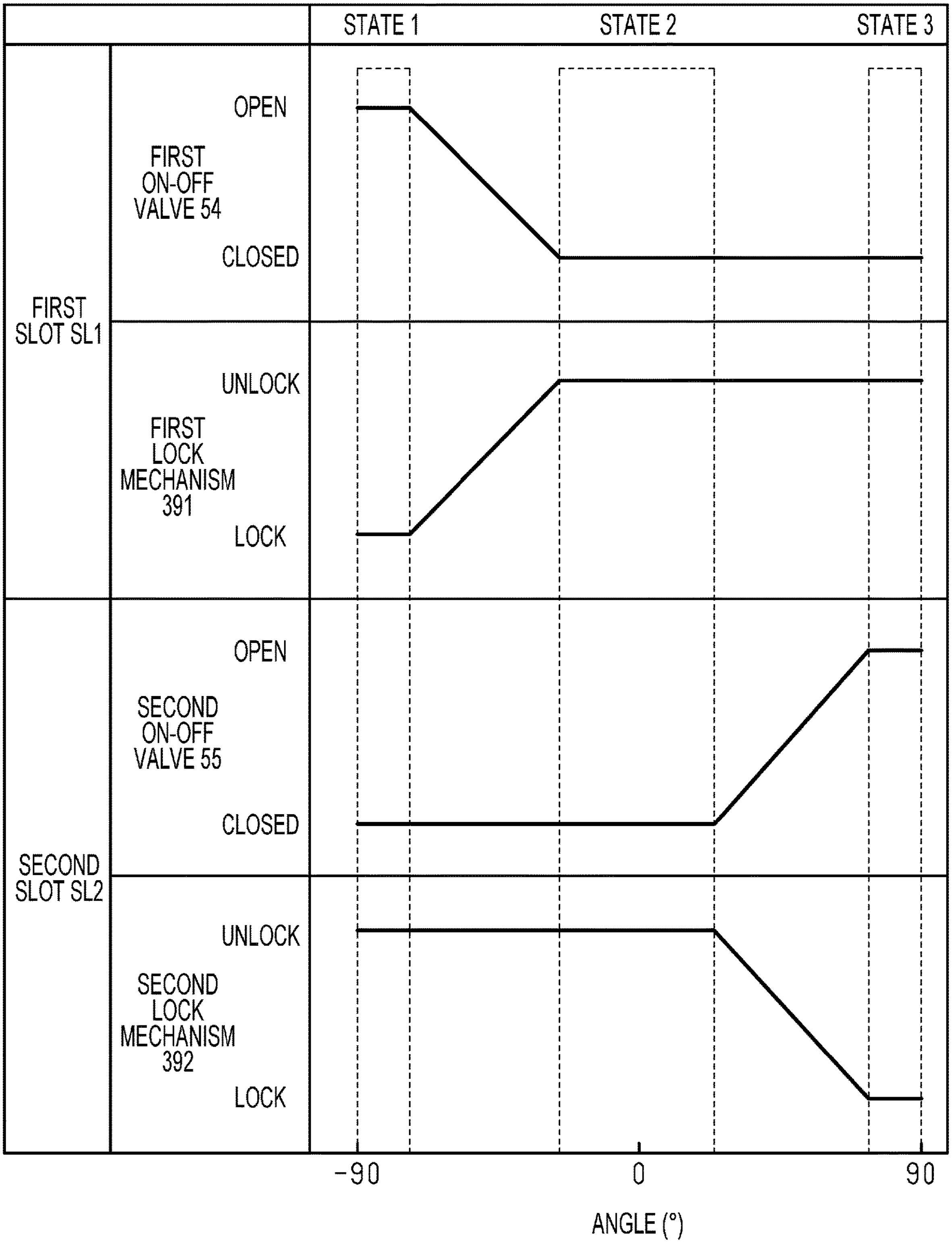
FIG. 10 is an operational transition diagram illustrating operational transition of on-off valves and lock mechanisms for first and second slots.

FIG. 10 illustrates the state transition of the on-off valve 54 and the lock mechanism 391 for the first slot SL1 and the state transition of the on-off valve 55 and the lock mechanism 392 for the second slot SL2. The state shifts into one of “State 1”, “State 2”, and “State 3” as a result of controlling the switching of the on-off valves 54 and 55 and controlling the switching of the lock mechanisms 391 and 392. In FIG. 10, the horizontal axis represents the angle of rotation of the shaft portion 65, to which the cams 61 to 64 are fixed. The control unit 25 controls the drive operation of the driving source 53, and, as a result of this driving control, the shaft portion 65 rotates in a reciprocating manner within an angular range of 180° from −90° to 90°.

The state is “State 1” when the angle of rotation of the shaft portion 65 is within a first angular range that includes −90°. The state is “State 2” when the angle of rotation of the shaft portion 65 is within a second angular range that includes 0°. The state is “State 3” when the angle of rotation of the shaft portion 65 is within a third angular range that includes 90°.

In “State 1”, the first on-off valve 54 for the first slot SL1 is in an open state, the first lock mechanism 391 for the first slot SL1 is in a lock state, the second on-off valve 55 for the second slot SL2 is in a closed state, and the second lock mechanism 392 for the second slot SL2 is in an unlock state.

In “State 2”, the first on-off valve 54 for the first slot SL1 is in a closed state, the first lock mechanism 391 for the first slot SL1 is in an unlock state, the second on-off valve 55 for the second slot SL2 is in a closed state, and the second lock mechanism 392 for the second slot SL2 is in an unlock state.

In “State 3”, the first on-off valve 54 for the first slot SL1 is in a closed state, the first lock mechanism 391 for the first slot SL1 is in an unlock state, the second on-off valve 55 for the second slot SL2 is in an open state, and the second lock mechanism 392 for the second slot SL2 is in a lock state.

In the present embodiment, switching between the states illustrated in FIG. 10 is performed by controlling the driving source 53 by the control unit 25. More specifically, switching between the states is performed by controlling the angle of rotation of each of the first cam 61, the second cam 62, the third cam 63, and the fourth cam 64 described above.

Figure 11:
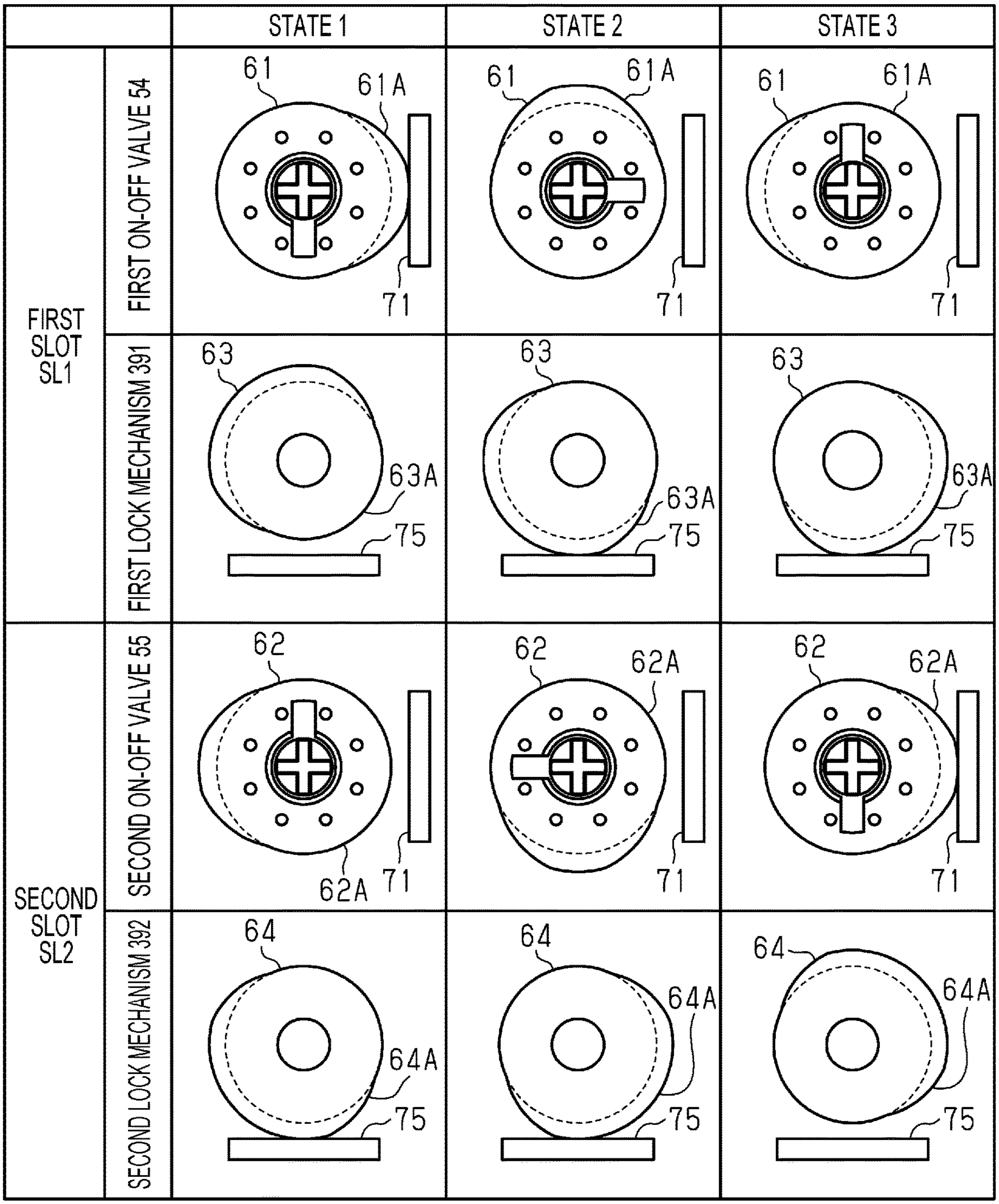
FIG. 11 is a cam transition diagram illustrating transition in rotational positions of cams for operating the on-off valves and the lock mechanisms for the first and second slots.

Next, with reference to FIG. 11, a relationship between the angles of rotation of the four cams 61 to 64 and the three states will now be explained. FIG. 11 is a graph that illustrates, for the two slots SL1 and SL2, a relationship between the angles of rotation of the four cams 61 to 64 and the transition states of the on-off valves 54 and 55 and the lock mechanisms 391 and 392.

As illustrated in FIG. 11, the first cam 61 is an eccentric cam having the cam face 61A formed on its outer periphery. The second cam 62 is an eccentric cam having the cam face 62A formed on its outer periphery. For example, the second cam 62 has the same size and the same shape as those of the first cam 61. The phase of the second cam 62 is shifted from that of the first cam 61 by approximately 180°. The third cam 63 is an eccentric cam having the cam face 63A formed on its outer periphery. The fourth cam 64 is an eccentric cam having the cam face 64A formed on its outer periphery. For example, the fourth cam 64 has the same size and the same shape as those of the third cam 63. The phase of the fourth cam 64 is shifted from that of the third cam 63 by approximately 90°.

With this structure, in State 1, the first on-off valve 54 is opened because the first cam 61 pushes the first lever 71, and the second on-off valve 55 is closed because the second cam 62 does not push the first lever 71. Moreover, in “State 1”, the first lock mechanism 391 is locked because the third cam 63 does not push the second lever 75, and the second lock mechanism 392 is unlocked because the fourth cam 64 pushes the second lever 75.

In State 2, the first on-off valve 54 is closed because the first cam 61 does not push the first lever 71, and the second on-off valve 55 is closed because the second cam 62 does not push the first lever 71. Moreover, in “State 2”, the first lock mechanism 391 is unlocked because the third cam 63 pushes the second lever 75, and the second lock mechanism 392 is unlocked because the fourth cam 64 pushes the second lever 75.

In State 3, the first on-off valve 54 is closed because the first cam 61 does not push the first lever 71, and the second on-off valve 55 is opened because the second cam 62 pushes the first lever 71. Moreover, in “State 3”, the first lock mechanism 391 is unlocked because the third cam 63 pushes the second lever 75, and the second lock mechanism 392 is locked because the fourth cam 64 does not push the second lever 75.

Operational Effects of Embodiment

Next, the operational effects of the liquid ejecting apparatus 11 and the liquid supplying apparatus 30 will now be explained.

With reference to FIGS. 1 to 12, an example of liquid supply control processing performed by the control unit 25 will now be explained. The control unit 25 according to the present embodiment performs the liquid supply control processing of controlling the liquid supplying apparatus 30. The liquid supply control processing includes controlling print operation of printing an image or a text on the medium 14 and controlling maintenance operation of discharging liquid from the liquid ejecting head 20 forcibly. The user gives instructions for print operation by operating the operation panel 24 or operating the input unit of the host apparatus 80. The user gives instructions for maintenance on the liquid ejecting head 20 by operating the operation panel 24 or operating the input unit of the host apparatus 80. The maintenance operation includes cleaning operation. The control unit 25 includes a management unit configured to manage the time that has elapsed from the last maintenance execution and the number of sheets that have been printed since the last maintenance execution. If either one of the elapsed time and the number of sheets exceeds the corresponding threshold, the control unit 25 receives instructions for maintenance operation from the management unit.

With reference to FIG. 12, the liquid supply control processing performed by the control unit 25 will now be explained.

In a step S11, the control unit 25 determines whether or not instructions for liquid-consuming operation are received. The liquid-consuming operation is operation involving the consumption of liquid (for example, ink) by the liquid ejecting head 20. In this example, the liquid-consuming operation includes print operation and maintenance operation. Accordingly, in this step, the control unit 25 determines whether or not instructions for print operation or instructions for maintenance operation are received. The process proceeds to a step S12 if instructions for liquid-consuming operation are received. If not, the process is in waiting state until the instructions are received.

In a step S12, the control unit 25 opens the one, of the two on-off valves, corresponding to the liquid container that is to be used. The control unit 25 has acquired use information for every liquid container 40 and information about the amount of liquid left therein. The use information is information for recognizing whether or not the liquid container 40 is currently used (active for use). When the currently-active one of the first liquid container 41 and the second liquid container 42 runs out of the liquid (for example, “ink end”), the use of the other such as brand-new one is started, and use information indicating that the other, the use-started brand-new one, is currently used is created. The timing of switching the one, of the first liquid container 41 and the second liquid container 42, that is to be used to the other, the brand-new one, can be set at design discretion. The timing of this switching is not limited to the timing of running out of the liquid (for example, "ink end"). This switching may be performed when the liquid left will be empty soon ("near end") or at any other timing of reaching a predetermined remaining amount.

In the step S12, for example, if the first liquid container 41 is to be used, the control unit 25 opens the first on-off valve 54 only, which corresponds to the first liquid container 41. The second on-off valve 55 remains closed when the first on-off valve 54 is opened. If, for example, the second liquid container 42 is to be used, the control unit 25 opens the second on-off valve 55 only, which corresponds to the second liquid container 42. The first on-off valve 54 remains closed when the second on-off valve 55 is opened.

In a step S13, the control unit 25 restricts the movement of the liquid container that is active for use. By controlling the movement restriction unit 39, the control unit 25 restricts the movement of the one, of the first liquid container 41 and the second liquid container 42, determined to be active for use. That is, if the liquid container that is active for use is the first liquid container 41, the control unit 25 restricts the movement of the first liquid container 41 only, by the locking of the first lock mechanism 391 and the unlocking of the second lock mechanism 392. If the liquid container that is active for use is the second liquid container 42, the control unit 25 restricts the movement of the second liquid container 42 only, by the unlocking of the first lock mechanism 391 and the locking of the second lock mechanism 392. In this way, the movement of the liquid container 40 that is currently in communication with the supply flow passage 35 is restricted by the movement restriction unit 39. The processing in the step S13 corresponds to "restricting the movement of the liquid container 40 that is currently in communication with the supply flow passage 35 is restricted by the movement restriction unit 39."

In the present embodiment, the control unit 25 executes the processing in the step S12 and the processing in the step S13 by controlling the driving source 53 to put the four cams 61 to 64 into "State 1" or "State 3" (see FIGS. 10 and 11 for both). More specifically, the four cams 61 to 64 are in "State 1" when the first liquid container 41 is currently used. In "State 1", the first on-off valve 54 is open, and the second on-off valve 55 is closed. In addition, in "State 1", the first lock mechanism 391 is in a lock state, and the second lock mechanism 392 is in an unlock state. Therefore, the user is unable to operate the first operation portion 34A from an engagement state to a non-engagement state while the liquid-consuming operation is performed. For this reason, the first liquid container 41, which is currently used, is not detachable during the liquid-consuming operation. On the other hand, the second liquid container 42, which is not currently used, is detachable during the liquid-consuming operation.

The four cams 61 to 64 are in "State 3" when the second liquid container 42 is currently used. In "State 3", the first on-off valve 54 is closed, and the second on-off valve 55 is open. In addition, in "State 3", the first lock mechanism 391 is in an unlock state, and the second lock mechanism 392 is in a lock state. Therefore, the user is unable to operate the second operation portion 34B from an engagement state to a non-engagement state while the liquid-consuming operation is performed. For this reason, the second liquid container 42, which is currently used, is not detachable during the liquid-consuming operation. On the other hand, the first liquid container 41, which is not currently used, is detachable during the liquid-consuming operation.

In a step S14, the control unit 25 causes the apparatus to perform liquid-consuming operation. The liquid-consuming operation includes print operation and maintenance operation. If the instructions for liquid-consuming operation are print instructions, the control unit 25 causes the apparatus to perform print operation. If the instructions for liquid-consuming operation are maintenance instructions, the control unit 25 causes the apparatus to perform maintenance operation. Upon completion of the liquid-consuming operation, the control unit 25 advances the process to a step S15. The processing in the step S14 corresponds to "performing the operation involving liquid consumption".

If the first liquid container 41 is currently used while the liquid-consuming operation is performed, the user is unable to operate the first operation portion 34A, which corresponds to the first liquid container 41, into a non-engagement state. If the second liquid container 42 is currently used while the liquid-consuming operation is performed, the user is unable to operate the second operation portion 34B, which corresponds to the second liquid container 42, into a non-engagement state. This makes it possible to prevent a print failure or a maintenance failure from occurring due to the removal of the liquid container 40 that is currently used while the print operation or the maintenance operation is performed.

In the step S15, the control unit 25 closes the first on-off valve 54 and the second on-off valve 55. That is, the control unit 25 controls the switching unit 38 to put the apparatus into a state in which neither of the first supply flow passage 36 and the second supply flow passage 37 is in communication with the supply flow passage 35. More specifically, the control unit 25 closes both the first on-off valve 54 and the second on-off valve 55 by controlling the driving source 53 to put the first cam 61 and the second cam 62 into "State 2" (see FIGS. 10 and 11). Therefore, when no liquid-consuming operation is performed, the first supply flow passage 36 configured to be in communication with the first liquid container 41 is closed, and the second supply flow passage 37 configured to be in communication with the second liquid container 42 is closed. Consequently, neither of the first supply flow passage 36 and the second supply flow passage 37 is in communication with the supply flow passage 35. The processing in the step S15 corresponds to "after the operation is performed, performing switching to a state in which neither of the first supply flow passage 36 and the second supply flow passage 37 is in communication with the supply flow passage 35 by the switching unit 38."

In a step S16, the control unit 25 puts the two liquid containers 41 and 42 into a non-restricted state. That is, the control unit 25 controls the movement restriction unit 39 to perform restriction cancellation such that the movement of the first liquid container 41 is not restricted and the movement of the second liquid container 42 is also not restricted. More specifically, the control unit 25 puts the first lock mechanism 391 into an unlock state in which the first engagement portion 33A is not locked in an engagement state and puts the second lock mechanism 392 into an unlock state in which the second engagement portion 33B is not locked in an engagement state, by controlling the driving source 53 to put the third cam 63 and the fourth cam 64 into "State 2" (see FIGS. 10 and 11). Therefore, when no liquid-consuming operation is performed, both the first liquid container 41 and the second liquid container 42 are detachable by operating the operation portion 34 by the user. As explained here, during the period of non-execution of liquid-consuming operation, in which a print failure or a maintenance failure could never happen, both the first liquid container 41 and the second liquid container 42 are detachable by the user. The processing in the step S16 corresponds to "after the operation is performed, performing restriction cancellation such that neither of the movement of the first liquid container 41 and the movement of the second liquid container 42 is restricted by the movement restriction unit 39."

In the present embodiment, the control unit 25 executes the processing in the step S15 and the processing in the step S16 by controlling the driving source 53 to put the four cams 61 to 64 into "State 2" (see FIGS. 10 and 11). In "State 2", both the first on-off valve 54 and the second on-off valve 55 are closed, and both the first lock mechanism 391 and the second lock mechanism 392 are in an unlock state. Therefore, when no liquid-consuming operation is performed, both the first liquid container 41 and the second liquid container 42 are detachable by operating the operation portion 34 by the user.

In the first embodiment, a control method that includes the following first, second, and third steps is implemented by performing the liquid supply control processing by the control unit 25.

First Step

When instructions for operation involving liquid consumption (instructions for liquid-consuming operation) are received, the following processing is performed. Either the first supply flow passage 36 or the second supply flow passage 37 is brought into communication with the supply flow passage 35 by the switching unit 38. In addition, the movement of the liquid container 40 that is currently in communication with the supply flow passage 35 is restricted by the movement restriction unit 39. The first step described here corresponds to the processing in the steps S12 and S13 illustrated in FIG. 12.

Second Step

The operation involving liquid consumption is performed. That is, the liquid-consuming operation, in which the liquid ejecting head 20 consumes liquid, is performed. The second step described here corresponds to the processing in the step S14 illustrated in FIG. 12.

Third Step

After the liquid-consuming operation is performed, switching to a state in which neither of the first supply flow passage 36 and the second supply flow passage 37 is in communication with the supply flow passage 35 is performed by the switching unit 38, and restriction cancellation is performed such that neither of the movement of the first liquid container 41 and the movement of the second liquid container 42 is restricted by the movement restriction unit 39. The third step described here corresponds to the processing in the steps S15 and S16 illustrated in FIG. 12.

Therefore, it is possible to prevent printing from being interrupted by the removal of the liquid container 40 that is currently used by operating the operation portion 34 by the user during print operation. Therefore, it is possible to prevent wasteful consumption of the medium 14 caused by a print failure due to the interruption, and prevent wasteful consumption of liquid such as ink due to redoing printing.

In addition, it is possible to prevent maintenance from being interrupted by the removal of the liquid container 40 that is currently used by operating the operation portion 34 by the user during maintenance operation. Therefore, it is possible to prevent wasteful consumption of liquid such as ink due to redoing the interrupted maintenance.

Moreover, in the present embodiment, the removal of the liquid container 40 that is currently used during print operation or during maintenance operation is prevented by mechanical locking. For example, it is possible to design and provide a configuration in which firmware troubleshoots an error in a case where the error occurs due to the removal of the liquid container 40 that is currently used during print operation or during maintenance operation. However, if such a configuration is adopted, the firmware needs to be capable of troubleshooting every predictable kind of error. This will make the firmware complex. Moreover, there is a risk of some omissions in error troubleshooting. Since the configuration of the present embodiment mechanically locks the liquid container 40 that is currently used so that it cannot be removed, it is possible to avoid the firmware from becoming complex and avoid omissions in error troubleshooting, and so forth. Therefore, the firmware will not be complex, and such an error caused by the removal of the liquid container 40 that is currently used will not occur.

As described in detail above, the following effects can be obtained from the present embodiment.

(1-1) The liquid supplying apparatus 30 includes: the supply flow passage 35 that is in communication with the liquid ejecting head 20 configured to eject liquid; the first supply flow passage 36 for communication between the first liquid container 41 and the supply flow passage 35, the first liquid container 41 containing liquid; and the second supply flow passage 37 for communication between the second liquid container 42 and the supply flow passage 35, the second liquid container 42 containing the same kind of liquid as the liquid contained in the first liquid container 41. The liquid supplying apparatus 30 further includes: the switching unit 38 configured to switch a flow passage that is in communication with the supply flow passage 35, between the first supply flow passage 36 and the second supply flow passage 37; and the movement restriction unit 39 configured to, linked with switching by the switching unit 38, restrict movement of the first liquid container 41 and the second liquid container 42 selectively. With this configuration, it is possible to restrict the movement of the liquid container 40 that is in communication with the liquid ejecting head 20 and not restrict the movement of the liquid container 40 that is not in communication with the liquid ejecting head 20. Therefore, it is possible to prevent the liquid container 40 that is currently used from being removed by mistake.

(1-2) When the switching unit 38 causes the first supply flow passage 36 to be in communication with the supply flow passage 35, the movement restriction unit 39 restricts the movement of the first liquid container 41. When the switching unit 38 causes the second supply flow passage 37 to be in communication with the supply flow passage 35, the movement restriction unit 39 restricts the movement of the second liquid container 42. With this configuration, it is possible to prevent the liquid container 40 that is currently used from being removed by mistake.

(1-3) The switching unit 38 includes the first on-off valve 54 for opening and closing the first supply flow passage 36, the second on-off valve 55 for opening and closing the second supply flow passage 37, and the first driving mechanism 51 for switching between opening and closing of the first on-off valve 54 and the second on-off valve 55. The movement restriction unit 39 includes the first engagement portion 33A configured to be engaged with the first liquid container 41, the second engagement portion 33B configured to be engaged with the second liquid container 42, and the second driving mechanism 52 configured to perform selective switching for each of the first engagement portion 33A and the second engagement portion 33B between a restriction state, in which the movement is restricted, and a non-restriction state, in which the movement is not restricted.

The liquid supplying apparatus 30 includes the driving source 53 configured to drive the first driving mechanism 51 and the second driving mechanism 52. This configuration makes it possible to, just with a single driving source 53, switch the opening/closing of the on-off valve 54, 55 and switch the engagement portion 33A, 33B between the restriction state and the non-restriction state. Therefore, it is possible to simplify the configuration of the liquid supplying apparatus 30.

(1-4) The first engagement portion 33A includes the first operation portion 34A operable by a user for disengagement from a state of engagement with the first liquid container 41. The second engagement portion 33B includes the second operation portion 34B operable by the user for disengagement from a state of engagement with the second liquid container 42. The second driving mechanism 52 is configured to perform selective switching for each of the first operation portion 34A and the second operation portion 34B between a restriction state, in which the disengagement from the state of engagement is restricted, and a non-restriction state, in which the disengagement from the state of engagement is not restricted.

In this configuration, operation of the first operation portion 34A is restricted when the first liquid container 41 is currently used, and operation of the second operation portion 34B is restricted when the second liquid container 42 is currently used. On condition that operation of the operation portion 34 is not restricted, the user is able to disengage the liquid container 40 by operating the operation portion 34 when the user wants to.

(1-5) The switching unit 38 includes the first on-off valve 54 for opening and closing the first supply flow passage 36, the second on-off valve 55 for opening and closing the second supply flow passage 37, and the first driving mechanism 51 for switching between opening and closing of the first on-off valve 54 and the second on-off valve 55. The movement restriction unit 39 includes the first engagement portion 33A configured to be engaged with the first liquid container 41, the second engagement portion 33B configured to be engaged with the second liquid container 42, and the second driving mechanism 52 configured to perform selective switching for each of the first engagement portion 33A and the second engagement portion 33B between an engagement state and a non-engagement state. The liquid supplying apparatus 30 includes the driving source 53 configured to drive the first driving mechanism 51 and the second driving mechanism 52. This configuration makes it possible to, just with a single driving source 53, switch the opening/closing of the first on-off valve 54 and the second on-off valve 55 and switch the engagement of the first engagement portion 33A and the second engagement portion 33B with the liquid container 40 between the engagement state and the non-engagement state. Therefore, it is possible to simplify the configuration of the liquid supplying apparatus 30.

(1-6) The first driving mechanism 51 includes the first cam 61 mounted on the shaft portion 65 and configured to switch the first on-off valve 54 between an open state and a closed state, the shaft portion 65 being configured to rotate when driven indirectly by and in synchronization with driving by the driving source 53, and further includes the second cam 62 mounted on the shaft portion 65 and configured to switch the second on-off valve 55 between an open state and a closed state. The second driving mechanism 52 includes the third cam 63 mounted on the shaft portion 65 and configured to switch the state of the first engagement portion 33A, and further includes the fourth cam 64 mounted on the shaft portion 65 and configured to switch the state of the second engagement portion 33B. This configuration realizes the switching of all of the first on-off valve 54, the second on-off valve 55, the first engagement portion 33A, and the second engagement portion 33B just by rotating the shaft portion 65 serving as a common shaft on which the first cam 61, the second cam 62, the third cam 63, and the fourth cam 64 are mounted. Therefore, it is possible to simplify the configuration of the liquid supplying apparatus 30.

(1-7) The liquid ejecting apparatus 11 includes: the liquid ejecting head 20 configured to eject liquid; the liquid supplying apparatus 30; and the control unit 25 that controls the switching unit 38 and the movement restriction unit 39. The liquid ejecting apparatus 11 having this configuration produces the same effects as those of the liquid supplying apparatus.

(1-8) When an amount of the liquid left in movement-restricted one of the liquid containers 40, the movement-restricted one being the one whose movement is restricted by the movement restriction unit 39, becomes smaller than a predetermined threshold, the control unit 25 switches the flow passage that is in communication with the supply flow passage 35, and cancels restriction on the movement-restricted one of the liquid containers 40 and causes the movement restriction unit 39 to restrict the movement of an other of the liquid containers 40. With this configuration, if the amount of the liquid left in the liquid container 40 that is currently used becomes smaller than the predetermined threshold, the liquid container 40 that is in communication with the liquid ejecting head 20 is automatically switched from the one, namely, the liquid container 40 that has currently been used, to the other of the liquid containers 40. Such automatic switching makes it possible to suppress the use of the liquid container 40 having a low remaining-liquid level. Moreover, it is possible to continue liquid-consuming operation without interruption even when the amount of the liquid left in the liquid container 40 that is currently used has become small.

(1-9) When non-restricted one of the liquid containers 40, the non-restricted one being the one whose movement is not restricted by the movement restriction unit 39, is replaced with a new liquid container 40, the control unit 25 switches the flow passage that is in communication with the supply flow passage 35. In addition to switching the flow passage that is in communication with the supply flow passage 35, the control unit 25 cancels the restriction on the movement of the other of the liquid containers 40 and causes the movement restriction unit 39 to restrict the movement of the new liquid container 40. With this configuration, the liquid contained in of the new liquid container 40 is always used first. Therefore, it is possible to continue liquid-consuming operation without interruption.

(1-10) Another disclosed aspect is a method for controlling the liquid ejecting apparatus 11 that includes the liquid ejecting head 20, the supply flow passage 35, the first supply flow passage 36, the second supply flow passage 37, the switching unit 38, and the movement restriction unit 39. The control method includes the following first, second, and third steps. In the first step, when instructions for operation involving liquid consumption are received, either the first supply flow passage 36 or the second supply flow passage 37 is brought into communication with the supply flow passage 35 by the switching unit 38, and, in addition, the movement of the liquid container 40 that is currently in communication with the supply flow passage 35 is restricted by the movement restriction unit 39 (steps S12 and S13). In the second step, the operation involving liquid consumption is performed (step S14). In the third step, after this operation is performed, switching to a state in which neither of the first supply flow passage 36 and the second supply flow passage 37 is in communication with the supply flow passage 35 is performed by the switching unit 38, and restriction cancellation is performed such that neither of the movement of the first liquid container 41 and the movement of the second liquid container 42 is restricted by the movement restriction unit 39 (steps S15 and S16). With this control method, it is possible to prevent the liquid container 40 from being removed by mistake while the operation involving liquid consumption is performed.

Second Embodiment

In the first embodiment described above, the movement of the currently-active one of the first liquid container 41 and the second liquid container 42 is restricted while liquid-consuming operation is performed. In a second embodiment, this movement is restricted while the power of the liquid ejecting apparatus 11 is ON.

The user turns the power of the liquid ejecting apparatus 11 ON by operating a power operation portion (not illustrated) of the operation panel 24. When the liquid ejecting apparatus 11 is powered ON, the control unit 25 is activated. Upon activation, the control unit 25 runs a program illustrated by the flowchart in FIG. 13.

Figure 13:
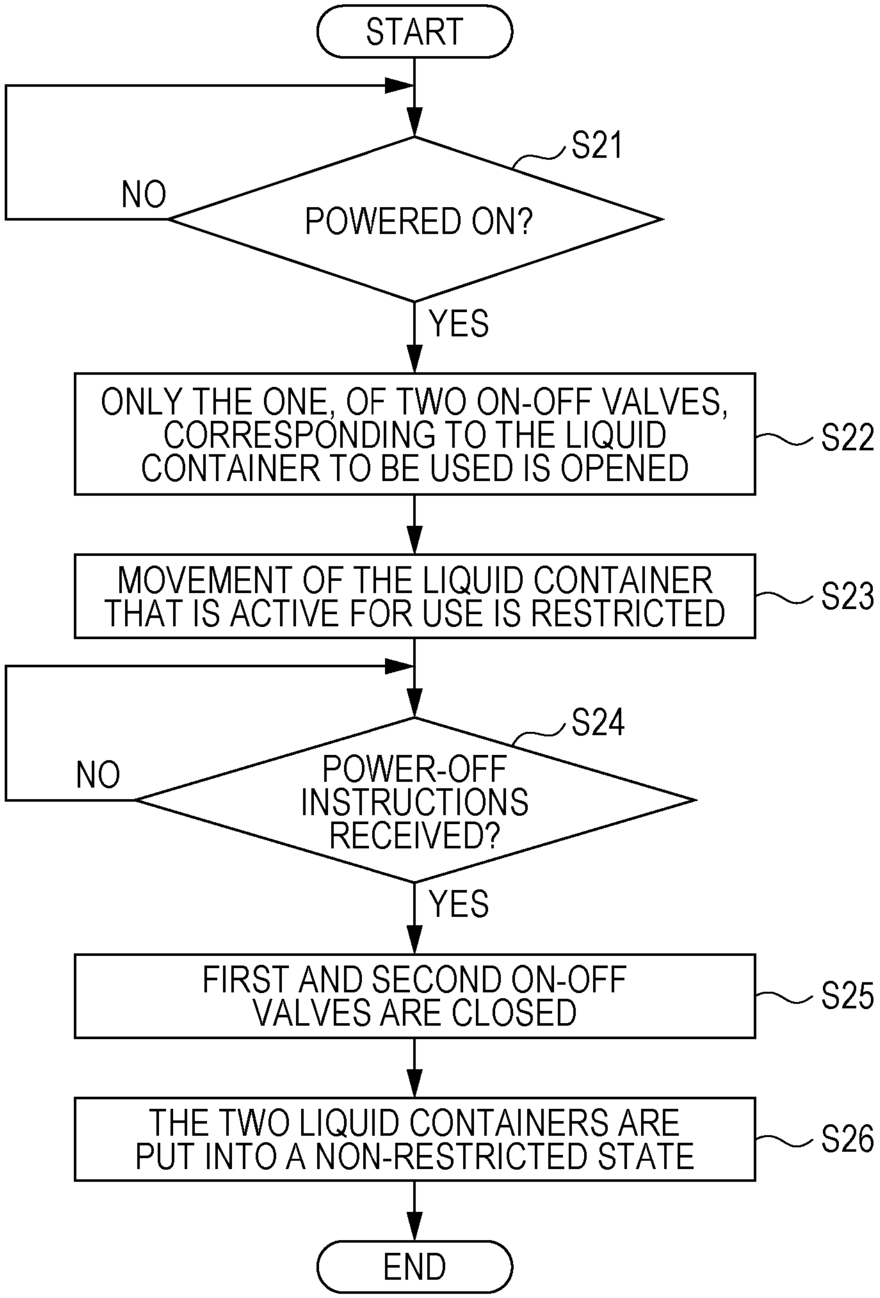
FIG. 13 is a flowchart of liquid supply control processing according to a second embodiment.

With reference to FIG. 13, the liquid supply control processing performed by the control unit 25 will now be explained.

First, in a step S21, the control unit 25 determines whether the power is turned ON or not. If the power is turned ON, the process proceeds to a step S22.

In steps S22 and S23, the control unit 25 performs the same processing as the processing performed in the steps S12 and S13 of the first embodiment.

In the step S22, the control unit 25 opens the one, of the two on-off valves, corresponding to the liquid container that is to be used. The control unit 25 identifies the liquid container 40 that is to be used (currently used) by acquiring, for every liquid container 40, use information and information about the amount of liquid left therein. Then, the control unit 25 opens the one, of the two on-off valves, corresponding to the one, of the first liquid container 41 and the second liquid container 42, identified as the liquid container that is to be used. For example, if the first liquid container 41 is to be used, the control unit 25 opens the first on-off valve 54 only. The second on-off valve 55 remains closed when the first on-off valve 54 is opened. If the second liquid container 42 is to be used, the control unit 25 opens the second on-off valve 55 only. The first on-off valve 54 remains closed when the second on-off valve 55 is opened.

In the step S23, the control unit 25 restricts the movement of the liquid container that is active for use. By controlling the movement restriction unit 39, the control unit 25 restricts the movement of the one, of the first liquid container 41 and the second liquid container 42, determined to be active for use. That is, if the liquid container that is active for use is the first liquid container 41, the control unit 25 restricts the movement of the first liquid container 41 only, by the locking of the first lock mechanism 391 and the unlocking of the second lock mechanism 392. If the liquid container that is active for use is the second liquid container 42, the control unit 25 restricts the movement of the second liquid container 42 only, by the unlocking of the first lock mechanism 391 and the locking of the second lock mechanism 392.

In the present embodiment, the control unit 25 executes the processing in the step S22 and the processing in the step S23 by controlling the driving source 53 to put the four cams 61 to 64 into "State 1" or "State 3" (see FIGS. 10 and 11 for both). The processing in the steps S22 and S23 corresponds to "when the liquid ejecting apparatus is powered on, bringing either the first supply flow passage 36 or the second supply flow passage 37 into communication with the supply flow passage 35 by the switching unit 38, and restricting the movement of the liquid container that is currently in communication with the supply flow passage 35 by the movement restriction unit 39."

Next, in a step S24, the control unit 25 determines whether or not instructions for turning the power OFF are received. If the instructions for turning the power OFF are received, the process proceeds to a step S25.

In steps S25 and S26, the control unit 25 performs the same processing as the processing performed in the steps S15 and S16 of the first embodiment.

In the step S25, the control unit 25 closes the first on-off valve 54 and the second on-off valve 55. That is, the control unit 25 controls the switching unit 38 to put the apparatus into a state in which neither of the first supply flow passage 36 and the second supply flow passage 37 is in communication with the supply flow passage 35. More specifically, the control unit 25 closes both the first on-off valve 54 and the second on-off valve 55 by controlling the driving source 53 to put the first cam 61 and the second cam 62 into "State 2" (see FIGS. 10 and 11). Therefore, in a power-OFF state, the first supply flow passage 36 configured to be in communication with the first liquid container 41 is closed, and the second supply flow passage 37 configured to be in communication with the second liquid container 42 is closed. Consequently, neither of the first supply flow passage 36 and the second supply flow passage 37 is in communication with the supply flow passage 35.

In the step S26, the control unit 25 puts the two liquid containers 41 and 42 into a non-restricted state. That is, the control unit 25 controls the movement restriction unit 39 to perform restriction cancellation such that the movement of the first liquid container 41 is not restricted and the movement of the second liquid container 42 is also not restricted. More specifically, the control unit 25 puts the first lock mechanism 391 into an unlock state in which the first engagement portion 33A is not locked in an engagement state and puts the second lock mechanism 392 into an unlock state in which the second engagement portion 33B is not locked in an engagement state, by controlling the driving source 53 to put the third cam 63 and the fourth cam 64 into "State 2" (see FIGS. 10 and 11). Therefore, in a power-OFF state, both the first liquid container 41 and the second liquid container 42 are detachable by operating the operation portion 34 by the user. As explained here, in a power-OFF state, in which a print failure or a maintenance failure could never happen, both the first liquid container 41 and the second liquid container 42 are detachable by the user.

The processing in the steps S25 and S26 corresponds to "when instructions for turning the power off are received, performing switching to a state in which neither of the first supply flow passage 36 and the second supply flow passage 37 is in communication with the supply flow passage 35 by the switching unit 38, and performing restriction cancellation such that neither of the movement of the first liquid container 41 and the movement of the second liquid container 42 is restricted by the movement restriction unit 39."

In the second embodiment, a control method that includes the following fourth and fifth steps is implemented by performing the liquid supply control processing by the control unit 25.

Fourth Step

When the liquid ejecting apparatus is powered on, either the first supply flow passage 36 or the second supply flow passage 37 is brought into communication with the supply flow passage 35 by the switching unit 38, and the movement of the liquid container 40 that is currently in communication with the supply flow passage 35 is restricted by the movement restriction unit 39. The fourth step described here corresponds to the processing in the steps S22 and S23 illustrated in FIG. 13.

Fifth Step

When instructions for turning the power off are received, switching to a state in which neither of the first supply flow passage 36 and the second supply flow passage 37 is in communication with the supply flow passage 35 is performed by the switching unit 38, and restriction cancellation is performed such that neither of the movement of the first liquid container 41 and the movement of the second liquid container 42 is restricted by the movement restriction unit 39. The fifth step described here corresponds to the processing in the steps S25 and S26 illustrated in FIG. 13.

In addition to the same effects as the effects (1-1) to (1-9) of the first embodiment, the following effect can be obtained from the second embodiment.

(2-1) Still another disclosed aspect is a method for controlling the liquid ejecting apparatus 11 that includes the liquid ejecting head 20, the supply flow passage 35, the first supply flow passage 36, the second supply flow passage 37, the switching unit 38, and the movement restriction unit 39. The control method includes the following fourth and fifth steps. In the fourth step, when the liquid ejecting apparatus is powered on, either the first supply flow passage 36 or the second supply flow passage 37 is brought into communication with the supply flow passage 35 by the switching unit 38, and, in addition, the movement of the liquid container 40 that is currently in communication with the supply flow passage 35 is restricted by the movement restriction unit 39 (steps S22 and S23). In the fifth step, when instructions for turning the power off are received, switching to a state in which neither of the first supply flow passage 36 and the second supply flow passage 37 is in communication with the supply flow passage 35 is performed by the switching unit 38, and restriction cancellation is performed such that neither of the movement of the first liquid container 41 and the movement of the second liquid container 42 is restricted by the movement restriction unit 39 (steps S25 and S26). With this control method, it is possible to prevent the liquid container 40 that is currently used from being removed by mistake while the power is ON. Moreover, it is possible to detach the liquid container 40 for replacement while the power is OFF.

Third Embodiment

In the first embodiment described earlier, the movement restriction unit 39 restricts the movement of the liquid container 40 that is currently used by locking the engagement portion 33 having the operation portion 34 and by, by the locking, not allowing the user to perform disengaging operation of the operation portion 34. By contrast, the engagement portion 33 according to a third embodiment does not have the operation portion 34. That is, the engagement portion 33 according to the present embodiment is not configured to be operated by the user. The movement restriction unit 39 according to the present embodiment causes the driving source 53 to perform driving to put the engagement portion 33 into an engagement state, in which the engagement portion 33 is in engagement with the liquid container 40, or a non-engagement state, in which the engagement portion 33 is not in engagement therewith. The movement of the liquid container 40 that is currently used is restricted (locked) by moving the engagement portion 33 to a position corresponding to the engagement state (engagement position) by the driving source 53. The movement of the liquid container 40 that is not currently used is not restricted (not locked) because the driving source 53 moves the engagement portion 33 to a position corresponding to the non-engagement state (non-engagement position). Accordingly, of the first liquid container 41 inserted in the first slot SL1 of the mounting unit 31 and the second liquid container 42 inserted in the second slot SL2 thereof, the one that is active for use is restricted, and the other, which is not active for use, is not restricted.

The third embodiment described here has a configuration obtained by eliminating the operation portion 34 from FIG. 4. The other basic configuration of the third embodiment is the same as the configuration of the first and second embodiments. Therefore, with reference to FIG. 4, etc., an explanation will be given below with a focus on the difference. Another point of difference from the first and second embodiments is that the engagement portion 33 is able to move between the engagement state and the non-engagement state due to driving via the rod 39A by the driving source 53.

As illustrated in FIG. 4, the switching unit 38 includes the first on-off valve 54 for opening and closing the first supply flow passage 36, the second on-off valve 55 for opening and closing the second supply flow passage 37, and the first driving mechanism 51 for switching between opening and closing of the first on-off valve 54 and the second on-off valve 55.

The movement restriction unit 39 includes the first engagement portion 33A and the second engagement portion 33B. The first engagement portion 33A is configured to be engaged with the first liquid container 41. The second engagement portion 33B is configured to be engaged with the second liquid container 42. The movement restriction unit 39 further includes the second driving mechanism 52 for selective switching between the engagement state and the non-engagement state of the first engagement portion 33A and the second engagement portion 33B. The liquid supplying apparatus 30 includes the driving source 53 configured to drive the first driving mechanism 51 and the second driving mechanism 52.

For example, the engagement portion 33 is urged in a direction of going from the engagement state toward the non-engagement state (restriction-canceling direction). More specifically, the engagement portion 33 is urged in the restriction-canceling direction by an urging member such as a spring. Driven by the motive power of the driving source 53 via the second driving mechanism 52, the engagement portion 33 is positioned from the non-engagement state into the engagement state against the urging force of the urging member, thereby coming into engagement with the liquid container 40. The positioning of the engagement portion 33 into the engagement state restricts the movement of the liquid container 40. That is, the liquid container 40 is locked such that it cannot be detached from the mounting unit 31.

Similarly to the first and second embodiments, also in the third embodiment, linked with switching by the switching unit 38, the movement restriction unit 39 restricts the movement of the first liquid container 41 and the second liquid container 42 selectively. When the switching unit 38 causes the first supply flow passage 36 to be in communication with the supply flow passage 35, the movement restriction unit 39 restricts the movement of the first liquid container 41. When the switching unit 38 causes the second supply flow passage 37 to be in communication with the supply flow passage 35, the movement restriction unit 39 restricts the movement of the second liquid container 42.

More specifically, when the switching unit 38 causes the first supply flow passage 36 to be in communication with the supply flow passage 35, the third cam 63 and the fourth cam 64 driven by the driving source 53 are in "State 1" (see FIG. 11). In "State 1", since the rod 39A pushes the first engagement portion 33A into the engagement position, the first engagement portion 33A is in engagement with the first liquid container 41. Consequently, the movement of the first liquid container 41 inserted in the first slot SL1 is restricted. Therefore, the user is unable to detach the first liquid container 41.

When the switching unit 38 causes the second supply flow passage 37 to be in communication with the supply flow passage 35, the third cam 63 and the fourth cam 64 driven by the driving source 53 are in "State 3" (see FIG. 11). In "State 3", since the rod 39A pulls the engagement portion 33 back into the non-engagement position, the second engagement portion 33B is not in engagement with the second liquid container 42. Consequently, the movement of the second liquid container 42 inserted in the second slot SL2 is restricted. Therefore, the user is unable to detach the second liquid container 42.

To realize the operation of the engagement portion 33A, 33B described above, the structure in the present embodiment is different from the structure in the first and second embodiments illustrated in FIG. 8. Specifically, the restriction portion 33C has a sloped surface (not illustrated) with which the head end portion 39B of the rod 39A is able to come into contact in the process of advancement of the rod 39A due to the urging force of the urging member 39S as illustrated in the upper part of FIG. 8. The head end portion 39B of the rod 39A pushes the engagement portion 33 from the non-engagement position into the engagement position via the sloped surface in the process of advancement of the rod 39A due to the urging force of the urging member 39S, and, as a result of this pushing, the engagement portion 33 comes into engagement with the liquid container 40. On the other hand, since the head end portion 39B of the rod 39A loses the force of pushing the engagement portion 33 via the sloped surface in the process of retraction of the rod 39A against the urging force of the urging member 39S, the engagement portion 33 is pulled back from the engagement position into the non-engagement position due to the urging force of an urging member such as a spring that is not illustrated. This puts the engagement portion 33 into the state of not being in engagement with the liquid container 40.

The same effects as the effects (1-1) to (1-9) of the first embodiment and the effect (2-1) to (1-9) of the second embodiment can be obtained from the third embodiment.

The exemplary embodiments described above may be modified as described in modification examples below. Any of the exemplary embodiments described above may be combined with any of the modification examples described below to produce another modification example. Any two or more of the modification examples described below may be combined together to produce another modification example.

The four cams 61 to 64 may be fixed to different shafts 65 configured to rotate by receiving the motive power of the driving source 53. When modified so, two of the four cams 61 to 64 may be fixed to a common shaft 65, and the remaining two of them may be fixed to another common shaft 65. Alternatively, the four cams 61 to 64 may be fixed to respective different shafts 65.

The liquid supplying apparatus 30 may include a plurality of driving sources 53 for driving the four cams 61 to 64. When modified so, two of the four cams 61 to 64 may be driven by a common driving source 53, and the remaining two of them may be driven by another common driving source 53. Alternatively, the four cams 61 to 64 may be driven individually by respective different driving sources 53.

The four cams 61 to 64 are not limited to eccentric cams, which are rotational-type plane cams. The four cams 61 to 64 may be plane cams or three-dimensional cams. When the four cams 61 to 64 are plane cams, they may be other rotational-type cams or translation-type cams. The four cams 61 to 64 may be mutually different types of cams. The four cams 61 to 64 may be a mixture of plane cams and three-dimensional cams. Examples of other rotational-type cam are: plate cam, face grooved cam, and face rib cam. Examples of translation-type cam are: translating cam, translating grooved cam, and translating rib cam. Examples of three-dimensional cam are: cylindrical cam, conical cam, convex globoidal cam, and concave globoidal cam.

The number of the cams is not limited to four. The two on-off valves 54 and 55 and the two lock mechanisms 391 and 392 may be switched by two cams. For example, two first levers 71 for switching the two on-off valves 54 and 55 respectively may be driven via one common cam. For example, two second levers 75 for switching the two lock mechanisms 391 and 392 respectively may be driven via another one common cam.

Although it has been described that the movement of one of two liquid containers 40 containing the same kind of liquid is restricted, the movement of one of three liquid containers 40 containing the same kind of liquid may be restricted. The bottom line is, it is sufficient as long as the movement of the currently-active one of a plurality of liquid containers 40 including the first liquid container 41 and the second liquid container 42 containing the same kind of liquid is restricted.

The mounting unit 31 may be equipped with, for each of its slots individually, a cover by which the liquid container 40 inserted in the slot is covered. The movement of the currently-active one of the liquid containers 40 may be restricted by locking, by the movement restriction unit 39, the cover by which the currently-active one of the two liquid containers 41 and 42 containing the same kind of liquid is covered. For example, when the driving source 53 is driven, the one of the engagement portions 33 corresponding to the currently-active one of the liquid containers 40 is put into a state of being in engagement with the cover by which the currently-active one of the liquid containers 40 is covered. In addition, the other of the engagement portions 33 corresponding to the currently-inactive one of the liquid containers 40 is put into a state of being not in engagement with the cover by which the currently-inactive one of the liquid containers 40 is covered.

The engagement portion 33 may be a snap-fit that is able to be engaged with the liquid container 40. More specifically, the first engagement portion 33A may be a first snap-fit that is able to be engaged with the first liquid container 41, and the second engagement portion 33B may be a second snap-fit that is able to be engaged with the second liquid container 42. When the first liquid container 41 is inserted into the first slot SL1, the first snap-fit comes into engagement with the first liquid container 41, thereby restricting the movement of the first liquid container 41. When the second liquid container 42 is inserted into the second slot SL2, the second snap-fit comes into engagement with the second liquid container 42, thereby restricting the movement of the second liquid container 42. The engagement with the snap-fit restricts the movement of the currently-active one of the first liquid container 41 and the second liquid container 42 while the liquid-consuming operation is performed. The other, namely, the currently-inactive one, is not in engagement with the snap-fit. Disengagement from the snap-fit is performed by moving the engagement pin of the snap-fit in a direction of disengagement from the liquid container 40 by utilizing motive power exerted when the control unit 25 causes the driving source 53 to perform driving.

The switching of the switching unit 38 and the movement restriction unit 39 may be performed between State 1 and State 3 only, without including State 2.

If a transportation scheme of transporting a cut-sheet medium 14 or the like is used, the transportation unit 23 may include a medium-containing portion such as a cassette in which sheets of the medium 14 are to be contained, a feeding unit configured to feed the medium 14 from the medium-containing portion, and transportation rollers configured to transport the medium 14 fed therefrom. The transportation unit 23 may include a tray on which the medium 14 is to be placed, a feeding unit configured to feed the medium 14 placed on the tray, and transportation rollers configured to transport, toward a recording position, the medium 14 fed therefrom.

The liquid is not limited to ink. For example, the liquid may be cleaning/washing liquid, pre-treatment liquid, or post-treatment liquid.

The medium 14 is not limited to paper such as roll paper or cut-sheet paper. For example, the medium 14 may be a plastic sheet/film, a metal sheet/film, a laminate sheet/film, or a ceramic sheet/film.

What is claimed is:

1. A liquid supplying apparatus, comprising:

a supply flow passage that is in communication with a liquid ejecting head configured to eject liquid;

a first supply flow passage for communication between a first liquid container and the supply flow passage, the first liquid container containing liquid;

a second supply flow passage for communication between a second liquid container and the supply flow passage, the second liquid container containing a same kind of liquid as the liquid contained in the first liquid container;

a switching unit configured to switch a flow passage that is in communication with the supply flow passage, between the first supply flow passage and the second supply flow passage; and a movement restriction unit configured to, linked with switching by the switching unit, restrict movement of the first liquid container and the second liquid container selectively.

2. The liquid supplying apparatus according to claim 1, wherein when the switching unit causes the first supply flow passage to be in communication with the supply flow passage, the movement restriction unit restricts the movement of the first liquid container, and when the switching unit causes the second supply flow passage to be in communication with the supply flow passage, the movement restriction unit restricts the movement of the second liquid container.

3. The liquid supplying apparatus according to claim 1, further comprising a driving source, wherein the switching unit includes a first on-off valve for opening and closing the first supply flow passage, a second on-off valve for opening and closing the second supply flow passage, and a first driving mechanism for switching between opening and closing of the first on-off valve and the second on-off valve, the movement restriction unit includes a first engagement portion configured to be engaged with the first liquid container, a second engagement portion configured to be engaged with the second liquid container, and a second driving mechanism configured to perform selective switching for each of the first engagement portion and the second engagement portion between a restriction state, in which the movement is restricted, and a non-restriction state, in which the movement is not restricted, and the driving source drives the first driving mechanism and the second driving mechanism.

4. The liquid supplying apparatus according to claim 3, wherein the first engagement portion includes a first operation portion, operable by a user, for releasing an engagement with the first liquid container, the second engagement portion includes a second operation portion, operable by the user, for releasing an engagement with the second liquid container, and the second driving mechanism is configured to perform selective switching for each of the first operation portion and the second operation portion between a restriction state, in which the disengagement from the state of engagement is restricted, and a non-restriction state, in which the disengagement from the state of engagement is not restricted.

5. The liquid supplying apparatus according to claim 3, wherein the first driving mechanism includes a first cam mounted on a shaft portion and configured to switch the first on-off valve between an open state and a closed state, the shaft portion being configured to rotate in conjunction with driving by the driving source, and further includes a second cam mounted on the shaft portion and configured to switch the second on-off valve between an open state and a closed state, the second driving mechanism includes a third cam mounted on the shaft portion and configured to switch the state of the first engagement portion, and further includes a fourth cam mounted on the shaft portion and configured to switch the state of the second engagement portion.

6. The liquid supplying apparatus according to claim 1, further comprising a driving source, wherein the switching unit includes a first on-off valve for opening and closing the first supply flow passage, a second on-off valve for opening and closing the second supply flow passage, and a first driving mechanism for switching between opening and closing of the first on-off valve and the second on-off valve, the movement restriction unit includes a first engagement portion configured to be engaged with the first liquid container, a second engagement portion configured to be engaged with the second liquid container, and a second driving mechanism configured to perform selective switching for each of the first engagement portion and the second engagement portion between an engagement state and a non-engagement state, and the driving source drives the first driving mechanism and the second driving mechanism.

7. A liquid ejecting apparatus, comprising:

a liquid ejecting head configured to eject liquid;

the liquid supplying apparatus according to claim 1; and a control unit that controls the switching unit and the movement restriction unit.

8. The liquid ejecting apparatus according to claim 7, wherein when an amount of the liquid contained in movement-restricted one liquid container whose movement is restricted by the movement restriction unit among the liquid containers becomes smaller than a predetermined threshold, the control unit switches the flow passage that is in communication with the supply flow passage, and cancels restriction on the movement-restricted one liquid container and causes the movement restriction unit to restrict the movement of the other liquid container.

9. The liquid ejecting apparatus according to claim 8, wherein when non-restricted one liquid container whose movement is not restricted by the movement restriction unit among the liquid containers is replaced with a new liquid container, the control unit switches the flow passage that is in communication with the supply flow passage, and cancels the restriction on the movement of the other liquid container and causes the movement restriction unit to restrict the movement of the new liquid container.

10. A method for controlling a liquid ejecting apparatus, the liquid ejecting apparatus including a liquid ejecting head that performs recording by ejecting liquid onto a medium, a supply flow passage that is in communication with the liquid ejecting head, a first supply flow passage for communication between a first liquid container and the supply flow passage, the first liquid container containing liquid, a second supply flow passage for communication between a second liquid container and the supply flow passage, the second liquid container containing a same kind of liquid as the liquid contained in the first liquid container, a switching unit configured to switch a flow passage that is in communication with the supply flow passage, between the first supply flow passage and the second supply flow passage, and a movement restriction unit configured to, linked with switching by the switching unit, restrict movement of the first liquid container and the second liquid container selectively, the method comprising:

when instructions for operation involving liquid consumption are received, bringing either the first supply flow passage or the second supply flow passage into communication with the supply flow passage by the switching unit, and restricting the movement of the liquid container that is currently in communication with the supply flow passage by the movement restriction unit;

performing the operation involving liquid consumption; and after the operation is performed, performing switching to a state in which neither of the first supply flow passage and the second supply flow passage is in communication with the supply flow passage by the switching unit, and performing restriction cancellation such that neither of the movement of the first liquid container and the movement of the second liquid container is restricted by the movement restriction unit.

11. A method for controlling a liquid ejecting apparatus, the liquid ejecting apparatus including a liquid ejecting head that performs recording by ejecting liquid onto a medium, a supply flow passage that is in communication with the liquid ejecting head, a first supply flow passage for communication between a first liquid container and the supply flow passage, the first liquid container containing liquid, a second supply flow passage for communication between a second liquid container and the supply flow passage, the second liquid container containing a same kind of liquid as the liquid contained in the first liquid container, a switching unit configured to switch a flow passage that is in communication with the supply flow passage, between the first supply flow passage and the second supply flow passage, and a movement restriction unit configured to, linked with switching by the switching unit, restrict movement of the first liquid container and the second liquid container selectively, the method comprising:

when the liquid ejecting apparatus is powered on, bringing either the first supply flow passage or the second supply flow passage into communication with the supply flow passage by the switching unit, and restricting the movement of the liquid container that is currently in communication with the supply flow passage by the movement restriction unit; and when instructions for turning the power off are received, performing switching to a state in which neither of the first supply flow passage and the second supply flow passage is in communication with the supply flow passage by the switching unit, and performing restriction cancellation such that neither of the movement of the first liquid container and the movement of the second liquid container is restricted by the movement restriction unit.

* * * * *